US007873790B2

(12) United States Patent
Bouchou et al.

(10) Patent No.: US 7,873,790 B2
(45) Date of Patent: Jan. 18, 2011

(54) MASS STORAGE SYSTEM AND METHOD WITH EMULATION AND MANAGEMENT PRIORITIES

(75) Inventors: Jean-Louis Bouchou, Rosny-Sous-Bois (FR); Christian Dejon, Paris (FR)

(73) Assignee: Bull S.A.S., Les Clayes-Sous-Bois (FR)

( * ) Notice: Subject to any disclaimer, the term of this patent is extended or adjusted under 35 U.S.C. 154(b) by 348 days.

(21) Appl. No.: 11/866,619

(22) Filed: Oct. 3, 2007

(65) Prior Publication Data

US 2008/0082769 A1 Apr. 3, 2008

(30) Foreign Application Priority Data

Oct. 3, 2006 (FR) .................................. 06 08639

(51) Int. Cl.
*G06F 12/00* (2006.01)

(52) U.S. Cl. ....................... 711/135; 711/133; 711/118; 711/129; 711/E12.001; 711/E12.026

(58) Field of Classification Search ..................... 711/4, 711/6, 113, 135
See application file for complete search history.

(56) References Cited

U.S. PATENT DOCUMENTS 5,530,850 A * 6/1996 Ford et al. .................. 707/206
5,566,315 A * 10/1996 Milillo et al. ............... 711/113
6,871,272 B2 * 3/2005 Butterworth ................ 711/167
6,922,754 B2 * 7/2005 Liu et al. .................... 711/138
7,487,288 B2 * 2/2009 Kishi et al. ................. 711/112
2002/0194444 A1 * 12/2002 Goodrich et al. ............ 711/167
2004/0019740 A1 * 1/2004 Nakayama et al. .......... 711/113
2004/0205380 A1 10/2004 Black
2004/0250007 A1 * 12/2004 Nagasuka et al. .............. 711/4
2004/0260861 A1 * 12/2004 Serizawa et al. ............... 711/4
2005/0055512 A1 3/2005 Kishi
2006/0155951 A1 * 7/2006 Asano et al. ................ 711/172
2007/0294276 A1 * 12/2007 Shen et al. .................. 707/102

OTHER PUBLICATIONS

France Patent Office, Preliminary Search Report in French App. No. FR 0608639, May 16, 2007.

* cited by examiner

*Primary Examiner*—Reginald G Bragdon
*Assistant Examiner*—Gurtej Bansal
(74) *Attorney, Agent, or Firm*—Miles & Stockbridge P.C.

(57) ABSTRACT

The present invention concerns a storage method and system (1) comprising processing means (11) and storage resources (20, 100) containing firstly storage means (20) including at least one physical library (P$20_1$ to P$20_n$) and secondly memory means (100) called a cache (100), in which the processing means (11) of the storage system (1), vis-à-vis the computer platforms ($10_1$ to $10_n$), emulate at least one virtual library (V$20_1$ to V$20_n$) from at least one physical library (P$20_1$ to P$20_n$) which the storage system has under its control, characterized in that the processing means (11) of the storage system (1) comprise a management module (30) responsible for emulation and managing priorities over time for accesses to the storage resources (20, 100) using the results of calculations of at least one cache activity index per determined periods of time, and of at least one cache occupancy rate at a given time.

33 Claims, 3 Drawing Sheets

MASS STORAGE SYSTEM AND METHOD WITH EMULATION AND MANAGEMENT PRIORITIES

FIELD OF THE INVENTION

The present invention relates to the area of data processing, and in particular to the mass storage of data of different formats, generated by different heterogeneous computer platforms such as platforms of type GCOS8®, Unix®, Linux® or Windows® for example. These platforms run data-saving software applications e.g. GCOS8/TMS, Bull OpenSave, Veritas NetBackup or Legato Networker allowing generated data to be saved by sending it towards mass storage systems via a communication network such as a network of SAN type (<<Storage Area Network >>) or a network of Internet type for example. Mass storage systems all comprise communication means via at least one communication network, and data processing means firstly to manage exchanges with computer platforms and secondly to manage the storage of data derived from these platforms. Mass storage systems also comprise firstly memory means to store the data needed to run the software applications managing system operations, and secondly high capacity storage means to store mass data sent by the different platforms to which these systems are connected.

BACKGROUND OF THE INVENTION

In the prior art several types of mass storage systems are known, in which the high capacity storage means consist of physical libraries of magnetic storage media, called cartridges, handled by robots. These physical libraries comprise a plurality of cartridges in which data is written and read by means of at least one reader which individually accesses, via robotics, each of these cartridges when a request for writing or reading is transmitted by one of the computer platforms to the mass storage system. However, these known prior art solutions have the major disadvantages of being relatively slow, and of rapidly becoming saturated when numerous requests for access to the physical libraries are sent by the platforms. Mass storage systems are also known in the prior art which comprise large size memory means, called cache, forming a buffer between the computer platforms and the physical libraries. These large-size memory means consist, for example, of a plurality of hard disks in which the data sent or consulted by the platforms can be temporarily stored, to facilitate platform accessing to data while the system performs necessary operations within the physical library of physical cartridges. These mass storage systems known in the prior art therefore allow data to be stored temporarily in large-size memory means, to enable access thereto by platforms more rapidly than if they accessed the physical library. These mass storage systems therefore allow data consultation and updating to be managed at the request of the computer platforms from which this data originate. However, on account of the multitude and complexity of the maintenance tasks performed by these systems, when requests are transmitted by the computer platforms, the slowness and easy saturation of the processing capacities of these systems remain major drawbacks. The large-size memory means of these mass storage systems effectively have a certain bandwidth which limits the possible number of simultaneous accesses to data.

In the prior art, in particular from patent application US 2005/055512 A1, mass storage systems are known which manage the flushing of various cache volumes in relation to pre-determined priorities and in relation to periods of inactivity corresponding to a low <<demand load >> when the need to flush the cache is low (since there is large free space in the cache). This type of solution has the disadvantage of only taking into account the occupancy of the cache, and does not allow fine-tuned management of the cache in relation to demands or the management of access to the cache by the computer platforms and the system itself.

From the prior art, particularly from patent application U.S. Pat. No. 5,566,315 A, mass storage systems are known in which an allocation rate and a blocking rate are calculated to regulate flushing of the cache. This type of solution has the disadvantage of not anticipating blockage of the cache, since it consists of calculating the number of times when space allocations have failed because too much cache space is used. This type of solution thus does not allow fine-tuned management of the cache either, in relation to demand, nor does it allow management of the accesses to the cache by the computer platforms and the system itself.

Finally, from the prior art, in particular from patent application U.S. Pat. No. 5,530,850 A, storage systems are known allowing the compacting of data stored and segmented on storage devices, subsequent to changes in entered data. This type of solution also has the disadvantage of not allowing fine-tuned management of the cache in relation to demand, nor the management of access to the cache by computer platforms and the system itself. Additionally, this type of solution does not allow the triggering of compacting in relation to the activity of the storage system.

SUMMARY OF THE INVENTION

In this context, it would be of interest to optimise the management of the different tasks of writing, reading and ensuring the maintenance of the physical libraries which a mass storage system has under its control.

The purpose of the present invention is to overcome some disadvantages of the prior art by proposing a storage system which is able to optimise the management of the different tasks of read, write and maintenance of physical libraries which are under its control, giving priority to data access by the computer platforms.

FEATURES OF THE INVENTION

This purpose is achieved with a storage system for data generated, in at least one format, by at least one computer platform and transmitted to the storage system via at least one communication network through access means of the platform to the storage system, the storage system comprising processing means and storage resources comprising firstly storage means containing at least one physical library including at least one robot capable of loading and unloading at least one data storage cartridge in and from at least one reader to allow the writing and reading of data transmitted by the computer platform in the physical library, and secondly memory means, called a cache, in which the processing means of the storage system emulate, vis-à-vis the computer platforms, at least one virtual library from at least one physical library which the storage system has under its control, the data thus stored in the physical library and the virtual library being grouped into groups of determined size, called virtual volumes, having at least one image in the physical library and/or one image in the virtual library, the access means of the platforms to the storage system thereby accessing for reading and writing, via the communication network, the image in the cache of each of the virtual volumes stored by the storage system, characterized in that the processing means of the storage system comprise a management module managing accesses to the storage resources both in the physical library and in the virtual library, in relation to requests transmitted by the access means of the computer platforms to the storage system, the management module being responsible for emulation of the virtual volumes of the physical library into virtual volumes of the virtual library of the cache and comprising firstly a module of cache activity control calculating at least one cache activity index per determined periods of time, reflecting utilization of the access bandwidth to the cache, and secondly a module of cache occupancy control calculating at least one cache occupancy rate at a given time, the management module triggering these calculations periodically or on an ad hoc basis whenever space is allocated for a new virtual volume in the cache and using the result of these calculations, with reference to at least one algorithm of management of the access bandwidth to the cache and implemented in the storage system, so as to regulate occupancy of the cache whilst managing priorities over time for access to the storage resources by the computer platforms to read/write virtual volumes of the cache or by the system itself for at least one operation, called flush of the cache, enabling the copying of data from at least one virtual volume of the virtual library towards at least one virtual volume of the physical library.

According to another feature, the cache consists of a plurality of hard disks on which a plurality of partitions is distributed, the management module comprising an organization module keeping permanently up to date information on the distribution of the partitions installed on the hard disks and on the distribution of the data recorded on the different partitions, this organization module, on the basis of this information, generating at least one directory containing information on the locations and utilization of the virtual volumes of the cache, the virtual volumes on which reading or writing is in progress being identified as open virtual volumes, and the virtual volumes on which no reading or writing is in progress being identified as closed virtual volumes.

According to another feature the management module comprises access means to the content of the storage resources of the system and verifies the content of the physical library and virtual library to assign to each of the virtual volumes a value, called a status, from among at least the following statuses:

- <<disk only>> status when the virtual volume has an image in the virtual library of the cache but does not have an image in the physical library or has at least one image in the physical library which is not valid i.e. does not contain the same data as the image in the virtual library;
- <<out of cache>> status when the virtual volume does not have any image in the virtual library of the cache;
- <<disk and tape>> status when the virtual volume has valid images both in the virtual library of the cache and in the physical library;
- <<swapping in>> status when the virtual volume has an image in the progress of being loaded in the virtual library, from an image in the physical library;
- <<swapping out>> status when the virtual volume has an image in the virtual library in the progress of being copied into an image of the physical library;
- <<incomplete>> status when the virtual volume of the virtual library is open and does not contain any data or contains incomplete data;
- <<moving out>> status when the virtual volume of the virtual library is in the progress of being copied from one partition of the cache to another;
- <<swappable>> status when the virtual volume has an image in the virtual library of the cache but has at least one image in the physical library which is not valid or the image in the virtual library is in progress of being copied into an image of the physical library, i.e. the volume either has (<disk only status or has <<swapping out>> status.

According to another feature, the module of cache occupancy control calculates firstly a so-called individual occupancy rate corresponding to calculation of the occupancy rate on each of the partitions of the cache individually, and secondly a so-called mean occupancy rate corresponding to calculation of the occupancy rate of all the partitions of the cache.

According to another feature, the mean occupancy rate of the cache at a given time, calculated by the module of cache occupancy control, corresponds for all the partitions of the cache, to the sum of the size of the data present in the closed virtual volumes having <<disk only>> status and the size for all the partitions allocated to the open virtual volumes, irrespective of their status, this sum being compared, for all partitions, to the total size available in all the partitions of the cache, to obtain the mean occupancy rate of all the partitions of the cache.

According to another feature, the individual occupancy rate of each partition of the cache at a given time, calculated by the module of cache occupancy control, corresponds, for each of the partitions of the cache individually, to the size of the data present in the virtual volumes having <<disk only>> status, whether they are open or closed, this size being compared for each partition with the total available size in the partition under consideration, to obtain the individual occupancy rate of each partition.

According to another feature, the activity index of the cache per determined periods of time, calculated by the module of cache activity control, corresponds to the mean, calculated over a determined number of successive determined time periods, of the maximum number of virtual volumes of the cache that are simultaneously open during each determined period of time.

According to another feature, the management module compares the activity index of the cache with a minimum activity threshold and a maximum activity threshold, compares the individual occupancy rate of the cache with a maximum occupancy threshold and compares the mean occupancy rate of the cache with a first threshold, called a priority threshold, below which occupancy of the cache has priority over flushing, and a second threshold, called a flush start threshold, above which flushing of the cache can be performed, to manage accesses to the cache by means of the management algorithm for managing the access bandwidth to the cache, implemented in the storage system, and comprising at least one of the following rules:

- if the value of the individual occupancy rate of a partition of the cache is higher than the value of the maximum occupancy threshold, irrespective of the value of the activity index of the cache, the flush operation of the cache is essential and is authorized to start to the possible detriment of accesses to the cache by the computer platforms, part of the access bandwidth to the cache then being used for the copying of one or more virtual volumes of this partition into the physical library during this flush operation,
- if the value of the activity index of the cache is less or equal to the value of the minimum activity threshold, any flush operation of the cache is authorized to start, to allow copying of one or more virtual volumes towards the physical library,

- if the value of the activity index of the cache lies between the value of the minimum activity threshold and the value of the maximum activity threshold, a flush operation of the cache already in progress is authorized to continue, the copying of one or more virtual volumes from the cache to the physical library being authorized during this flush operation in progress, but if no flush operation is in progress a new flush operation of the cache is not authorized to start,
- if the value of the activity index of the cache is higher than the value of the maximum activity threshold, a new flush operation of the cache is not authorized to start and a flush operation of the cache already in progress is interrupted, to the benefit of accessing to the cache by the computer platforms, unless the value of the individual occupancy rate of the cache is higher than the value of the maximum occupancy threshold or unless the value of the mean occupancy rate of the cache is higher than the flush start threshold, new copying of one or more virtual volumes from the cache into the physical library, during a flush operation already in progress, then being forbidden, whilst copying already in progress of one or more virtual volumes from the cache to the physical library, during this flush operation in progress, is authorized to be completed,
- if the value of the mean occupancy rate of all the partitions of the cache is less or equal to the value of the priority threshold, accesses to the storage resources in reply to requests transmitted by the access means of the computer platforms to the storage system have priority over the accesses needed to copy volumes requiring the same resources during a flush operation of the cache, this copying then possibly being deferred until release of these resources,
- if the value of the mean occupancy rate of all the partitions of the cache is higher than the priority threshold, accesses to the storage resources in reply to requests transmitted by the access means of the computer platforms to the storage system, do not have priority over the accesses needed to copy volumes requiring the same resources during a flush operation of the cache which can therefore be started or continued to the possible detriment of accesses to the storage resources by the computer platforms,
- if the value of the mean occupancy rate of all the partitions of the cache is less or equal to the value of the flush start threshold, a flush operation of the cache towards the physical library is only authorized to start if the value of the activity index of the cache is less or equal the value of the minimum activity threshold,
- if the value of the mean occupancy rate of all the partitions of the cache is higher than the value of the flush start threshold, a flush operation of the cache towards the physical library is essential and is authorized to start.

According to another feature, the module of cache activity control comprises means for consulting information generated by the organization module, to calculate the activity index of the cache by counting the number of open virtual volumes, the maximum activity threshold corresponding to the total number of virtual volumes of the cache open at the same time which consume a fraction of the bandwidth that is considered too high to allow an internal operation to start which requires access to the cache.

According to another feature, the module of cache occupancy control comprises means for consulting the information generated by the organization module, to calculate firstly the mean occupancy rate of the cache by comparing the sum of the total size of the data present in the open virtual volumes, irrespective of their status, and the total size of the data present in the closed virtual volumes having <<disk only>> status, with the total storage capacity in all the partitions of the cache, and secondly to calculate the individual occupancy rate of each of the partitions of the cache by comparing, for a given partition, the size of the data present in the virtual volumes having <<disk only>> status, whether they are open or closed, with the total storage capacity of this partition of the cache.

According to another feature, the organization module cooperates with the module of cache activity control and the module of cache occupancy control to distribute the virtual volumes equitably over the different partitions of the cache, in order to promote homogeneous distribution over all the disks carrying the different partitions of the cache.

According to another feature, the management module, during the flush operation of the cache, uses the results of the calculations made by the module of cache occupancy control to select those virtual volumes of the cache to be copied into the physical library, the virtual volumes thus selected being the closed virtual volumes having <<disk only>> status and which were the less recently accessed, for reading or writing, by the computer platforms, either in a given partition of the cache if the value of the individual occupancy rate of this partition is greater or equal to the value of the maximum occupancy threshold, or in all the partitions of the cache if the values of the individual occupancy rates of all the partitions are below the value of the maximum occupancy threshold.

According to another feature, the management module comprises a module of activity control of the physical library, keeping permanently up to date at least information on the utilization of the readers and/or of the cartridges of the physical libraries under the control of the storage system, this information thereby enabling the management module to manage priorities over time for accesses to the storage resources, firstly by the system itself to flush at least one virtual volume of the cache towards at least one virtual volume of the physical library, and secondly by the computer platforms to read/write a virtual volume not present in the cache and therefore necessitating consultation of the physical library to copy a virtual volume of this physical library towards the cache, in the form of a virtual volume of the virtual library.

According to another feature, the management module, through its access means to the content of the storage resources of the system, keeps permanently up to date at least information on the validity of the virtual volumes present in the cartridges of the physical libraries under the control of the storage system, with respect to the virtual volumes which may have been modified in the cache by the computer platforms, this information on validity enabling the management module to compare the space occupied by the obsolete virtual volumes in the cartridges of the physical library with a maximum invalidity threshold, and when this space of obsolete virtual volumes reaches this threshold, to perform compacting of the valid volumes of this physical library, in the cartridges containing virtual volumes in the physical library that are not utilized and/or corresponding to closed virtual volumes in the cache, by controlling the reading of all the valid volumes of the source cartridges containing obsolete volumes and simultaneously copying these valid volumes into target cartridges, so as to erase these source cartridges and obtain only cartridges containing valid volumes in the physical library and empty cartridges.

According to another feature, the management module, responsible for emulation of the virtual volumes of the physical library into virtual volumes of the virtual library of the cache, offers the possibility that a virtual volume of the cache may have multiple images in the physical library, and that those virtual volumes of the cache taken into account by the module of cache occupancy control for the calculation of the occupancy rate, are volumes which correspond to the virtual volumes of the cache having <<disk only>> status, i.e. having images present in the physical library which are not all valid.

According to another feature, the management module uses the results of the operations performed by the module of cache activity control, the module of cache occupancy control and module of activity control of the physical library, so that the compacting of the valid volumes of the physical library by the management module is conducted in relation to the activity and occupancy of the cache, giving preference to access to the storage resources by the computer platforms over accessing required for this compacting.

According to another feature the processing means run a software application forming all the modules of the storage system and responsible for the interoperability of the different means of the system, this software application cooperating with an operating system installed on the storage system to manage the operations to be performed by generating information on at least the locations and utilization of all the data present in the storage system, the data needed for running this application being previously recorded in a memory accessible by the processing means of the system.

A further purpose of the present invention is to propose a data-saving method allowing optimised management of the different write, read and library maintenance tasks under its control, by giving priority to data access by the computer platforms.

This purpose is achieved with a method for saving/storing data generated, in at least one format, by at least one computer platform and transmitted to a storage system via a communication network through platform access means accessing the storage system, the storage system comprising storage resources comprising firstly storage means containing at least one physical library including at least one robot able to load and unload at least one data storage cartridge in and from at least one reader allowing the writing and reading of data transmitted by the computer platform in the physical library, and secondly comprising memory means, called a cache, in which the processing means of the storage system, vis-à-vis the computer platforms, emulate at least one virtual library from at least one physical library which the storage system has under its control, the data thus stored in the physical library and in the virtual library being grouped into groups of determined size, called virtual volumes, having at least image in the physical library and/or one image in the virtual library, the access means of the platforms to the storage system thereby accessing for reading and writing, via the communication network, the image in the cache of each of the virtual volumes stored by the storage system, the method being characterized in that it comprises at least the following steps:

- emulation of the virtual volumes of the physical library into virtual volumes of the virtual library of the cache, by a management module present in the processing means of the storage system and managing accesses to the storage resources both to virtual volumes de of the physical library and to virtual volumes of the cache, in relation to requests transmitted by the access means of the computer platforms to the storage system;
- calculation, by a module of cache activity control, of at least one activity index of the cache per determined periods of time, reflecting utilization of the access bandwidth to the cache, this calculation step being repeated to monitor changes in activity of the cache periodically or on an ad hoc basis whenever space is allocated for a new virtual volume in the cache;
- calculation, by a module of cache occupancy control, of at least one occupancy rate of the cache at a given time, this calculation step being repeated to monitor changes in occupancy of the cache periodically or an ad hoc basis whenever space is allocated for a new virtual volume in the cache;
- decision, by the management module, in relation to the results of these calculations and to at least one management algorithm for managing the access bandwidth to the cache, implemented in the storage system, between authorization or interdiction of access to the storage resources by the computer platforms to read/write virtual volumes in the cache, or by the system itself for at least one operation, called a cache flush, allowing the copying of data from at least one virtual volume of the virtual library to at least one virtual volume of the physical library, so as to regulate occupancy of the cache whilst managing priorities over time for accesses to the resources by the platforms and by the system itself.

According to another feature, the method comprises firstly at least one installation step to install a plurality of partitions on a plurality of hard disks forming the cache, and secondly at least one step for the creation and updating, by an organization module, of data representing information on the distribution of partitions and on the distribution of data recorded in the different partitions, this organization module, on the basis of this information, generating at least one directory containing information on the locations and utilization of the virtual volumes, the virtual volumes on which reading or writing is in progress being identified as open virtual volumes, and the virtual volumes on which no reading or writing is in progress being identified as closed virtual volumes.

According to another feature, the method comprises a verification step of the content of the physical library and of the virtual library by the management module, via access means to the content of the storage resources of the system, followed by an assignment step, to each of the virtual volumes, of a value called a status, from among at least the following statuses:

- <<disk only>> status when the virtual volume has an image in the virtual library of the cache but does not have an image in the physical library, or has at least one image in the physical library which is not valid, i.e. does not contain the same data as the image in the virtual library;
- <<out of cache>> status when the virtual volume does not have any image in the virtual library of the cache;
- <<disk and tape>> status when the virtual volume has valid images both in the virtual library of the cache and in the physical library;
- <<swapping in>> status when the virtual volume has an image in the progress of being loaded into the virtual library, from an image in the physical library;
- <<swapping out>> status when the virtual volume has an image in the virtual library in the progress of being copies into an image of the physical library;
- <<incomplete>> status when the virtual volume of the virtual library is open and does not contain any data, or contains incomplete data;
- <<moving out>> status when the virtual volume of the virtual library is in the progress of being copied from one partition of the cache to another;
- <<swappable>> status when the virtual volume has an image in the virtual library of the cache but has at least one image in the physical library which is not valid or the image in the virtual library is in the progress of being copied into an image of the physical library, i.e. the volume either has <<disk only>> status or <<swapping out>> status.

According to another feature, the step to calculate the occupancy rate of the cache at a given time, by the module of cache occupancy control, comprises firstly a step to calculate a so-called individual occupancy rate, corresponding to calculation of the occupancy rate on each of the partitions of the cache individually, and secondly a step to calculate a so-called mean occupancy rate, corresponding to calculation of the occupancy rate of all the partitions of the cache.

According to another feature, the step to calculate the mean occupancy rate of the cache, by the module of cache occupancy control, consists of measuring, for all the partitions of the cache, the sum of the size of the data present in the closed virtual volumes having <<disk only>> status and the size allocated to the open virtual volumes, irrespective of their status, this sum being compared with the total size available in all the partitions of the cache, to obtain the mean occupancy rate of all the partitions of the cache.

According to another feature, step to calculate the individual occupancy rate of each partition of the cache, by the module of cache occupancy control, consists of measuring, for each of the partitions of the cache individually, the total size of the data present in the virtual volumes having <<disk only>> status, whether they are open or closed, this size being compared with the total available size in the partition under consideration of the cache, to obtain the mean occupancy rate of each of the partitions of the cache.

According to another feature, step to calculate the activity index of the cache per determined periods of time, by the module of cache activity control, consists of calculating a mean, calculated over a determined number of successive determined time periods, of the maximum number of virtual volumes of the cache opened simultaneously during each determined time period.

According to another feature, the method comprises at least one additional comparison step to compare the activity index of the cache with a minimum activity threshold and a maximum activity threshold, a comparison step of the individual occupancy rate of the cache with the maximum occupancy threshold and a comparison step of the mean occupancy rate with a first threshold called a priority threshold, below which occupancy of the cache has priority over flushing, and with a second threshold called a flush start threshold above which flushing of the cache can be performed, implemented by the management module to manage accesses to the cache by means of the management algorithm for managing the access bandwidth to the cache, implemented in the storage system, and comprising at least one of the following rules:

- if the value of the individual occupancy rate of a partition of the cache is higher than the value of the maximum occupancy threshold, irrespective of the value of the activity index of the cache, the flush operation of the cache is essential and is authorized to start to the possible detriment of accesses to the cache by the computer platforms, part of the access bandwidth to the cache then being used to copy one or more virtual volumes from this partition towards the physical library during this flush operation,
- if the value of the activity index of the cache is less or equal to the minimum activity threshold, any flush operation of the cache is authorized to start, to allow the copying of one or more virtual volumes towards the physical library,
- if the value of the activity index of the cache lies between the value of the minimum activity threshold and the value of the maximum activity threshold, a flush operation of the cache already in progress is authorized to continue, the copying of one or more virtual volumes from the cache to the physical library being authorized during this flush operation in progress, but if no flush operation is in progress a new flush operation of the cache is not authorized to start,
- if the value of the activity index of the cache is higher than the value of the maximum activity threshold, a new flush operation of the cache is not authorized to start and a flush operation of the cache already in progress is interrupted, to the benefit of accessing to the cache by the computer platforms, unless the value of the individual occupancy rate of the cache is higher than the value of the maximum occupancy threshold or unless the value of the mean occupancy rate of the cache is higher than the flush start threshold, new copying of one or more virtual volumes from the cache to the physical library, during a flush operation already in progress, then being forbidden, whilst copying already in progress of one or more virtual volumes from the cache to the physical library, during this flush operation in progress, is authorized to be completed,
- if the value of the mean occupancy rate of all the partitions of the cache is less or equal to the priority threshold, accesses to the storage resources, in reply to requests transmitted by the access means of the computer platforms to the storage system, have priority over accessing needed to copy volumes requiring the same resources during a flush operation of the cache, this copying then possibly being deferred until release of these resources,
- if the value of the mean occupancy rate of all the partitions of the cache is higher than the priority threshold, accesses to the storage resources in reply to requests transmitted by the access means of the computer platforms to the storage system do not have priority over accesses needed to copy volumes requiring the same resources during a flush operation of the cache, which can therefore start or continue to the possible detriment of accessing to the storage resources by the computer platforms,
- if the value of the mean occupancy rate of all the partitions of the cache is less or equal to the value of the flush start threshold, a flush operation of the cache towards the physical library is only authorized to start if the value of the activity index of the cache is less or equal to the value of the minimum activity threshold,
- if the value of the mean occupancy rate of all the partitions of the cache is higher than the value of the flush start threshold, a flush operation of the cache towards the physical library is essential and is authorized to start.

According to another feature, the step to calculate the activity index of the cache, by the module of cache activity control, comprises at least one consultation step of the data generated by the organization module, to calculate the activity index of the cache by counting the number of open virtual volumes in the cache, the maximum activity threshold corresponding to the total number of virtual volumes of the cache open at the same time which consume a fraction of the access bandwidth considered too high to allow the start of an internal operation requiring access to the cache.

According to another feature, the step to calculate the occupancy rate of the cache, by the module of cache occupancy control, comprises at least one consultation step of the data generated by the organization module to calculate firstly the mean occupancy rate of the cache by comparison of the sum of the total size of the data present in the open virtual volumes, irrespective of their status, and the total size of the data present in the closed virtual volumes having <<disk only>> status, with the total storage capacity of all the partitions of the cache, and secondly the individual occupancy rate of each of the partitions of the cache by comparison, for a given partition, of the size of the data present in the virtual volumes having <<disk only>> status, whether they are open or closed, with the total storage capacity of this partition of the cache.

According to another feature, the emulation step of the virtual volumes by the management module comprises a cooperation step of the organization module with the module of cache activity control and the module of cache occupancy control to distribute the virtual volumes equitably over the different partitions of the cache, in order to promote homogeneous distribution over all the disks carrying the different partitions of the cache.

According to another feature, the flush operation of the cache, results from the use, by the management module, of the results of the calculations made by the module of cache occupancy control, to select the virtual volumes of the cache to be copied into the physical library, the virtual volumes thus selected being closed virtual volumes having <<disk only>> status and which were the less recently accessed for reading or writing by the computer platforms, either in a given partition of the cache if the value of the individual occupancy rate of this partition is greater or equal to the value of the maximum occupancy threshold, or in all the partitions of the cache if the values of the individual occupancy rates of all the partitions are lower than the value of the maximum occupancy threshold.

According to another feature, the method comprises at least one step for the creation and update, by a module of activity control of the physical library, of data representing information on utilization of the readers and/or of the cartridges of the libraries under the control of the storage system, this information thereby enabling the management module to manage priorities over time for accesses to the storage resources, firstly by the system itself to flush at least one virtual volume from the cache towards a volume of the physical library, and secondly by the computer platforms to read/write a virtual volume not present in the cache and therefore necessitating consultation of the physical library to copy a volume from this physical library to the cache, in the form of a virtual volume of the virtual library.

According to another feature, the method comprises at least one step for the creation and update, by the management module, of data representing information on the validity of the volumes present in the cartridges of the physical libraries under the control of the storage system, with respect to the virtual volumes which may have been modified in the cache by the computer platforms, this information on validity enabling the management module to implement a comparison step of the space occupied by obsolete virtual volumes in the cartridges of the physical library with a maximum invalidity threshold and, if this space occupied by these obsolete virtual volumes reaches this threshold, to implement a compacting step of the valid volumes, taken from cartridges containing volumes that are non-utilized and/or correspond to closed virtual volumes, by controlling the reading of all the valid volumes of the source cartridges containing obsolete volumes and simultaneously copying these valid volumes into target cartridges, so as to erase these source cartridges and only obtain cartridges containing valid volumes in the physical library.

According to another feature, the emulation steps of the virtual volumes of the physical library into virtual volumes of the virtual library of the cache and the management steps of the cache by the management module, offer the possibility that a virtual volume of the cache may have multiple images in the physical library, step by the management module to create and update information representing validity of the volumes present in the cartridges of the physical libraries allowing those virtual volumes of the cache taken into account by module of cache occupancy control, for calculation of the occupancy rate, to correspond to the virtual volumes of the cache having <<disk only>> status, i.e. having images present in the physical library which are not all valid.

According to another feature, the compacting step of the physical library comprises a step, in which the management module uses the results of the operations performed by module of cache activity control, module of cache occupancy control and module of activity control of the physical library, so that the compacting of the valid volumes of the physical library by the management module is performed in relation to the activity and occupancy of the cache, by giving preference to accessing to the storage resources by the computer platforms over accessing needed for this compacting.

According to another feature, the method comprises a step to install a software application in the operating system of the storage system, this software application forming all the modules of the storage system and responsible for the interoperability of the different means of this system, this software application cooperating with an operating system installed on the storage system to manage the operations to be performed by generating information on at least the locations and utilization of all the data present in the storage system, this installation step enabling the recording of the data needed to run this application in a memory accessible by the processing means of the system.

BRIEF DESCRIPTION OF THE DRAWINGS

Other particular aspects and advantages of the present invention will become more clearly apparent from the description given below with reference to the appended drawings in which.

DESCRIPTION OF THE PREFERRED EMBODIMENTS

Figure 1:
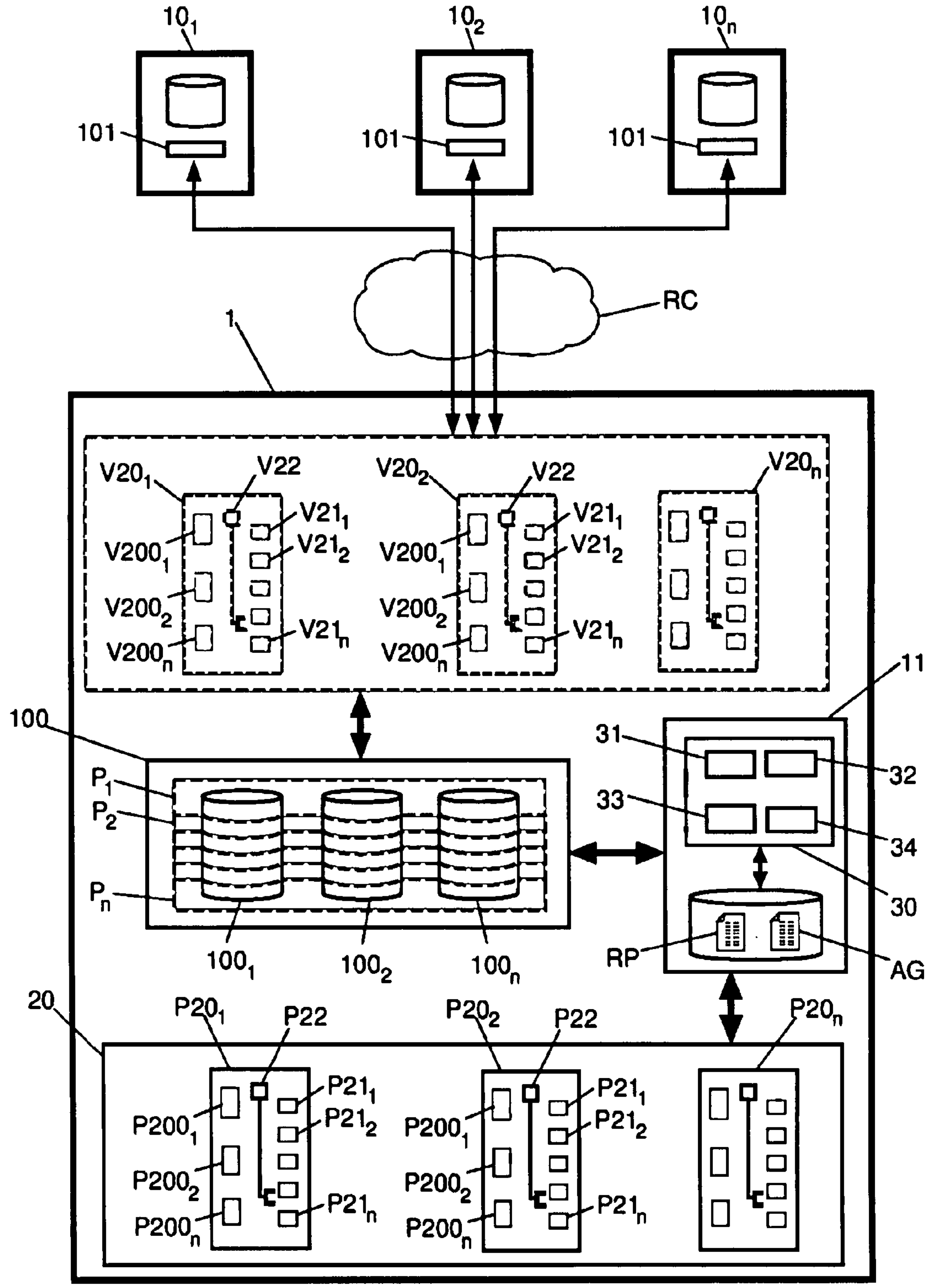
FIG. 1 shows the storage system according to one embodiment of the invention.

The present invention concerns a storage method and storage system 1 for data generated by at least one computer platform $\mathbf{10}_1$ to $\mathbf{10}_n$. As mentioned previously, the invention allows the saving of data derived from various types of computer platforms, for example such as GCOS8®, Unix®, Linux® or Windows®. These platforms run data-saving software applications, such as GCOS8/TMS, Bull OpenSave, Veritas NetBackup or Legato Networker for example, enabling generated data to be saved by sending it towards mass storage systems via a communication network, such as the Internet network for example. Data items are generated by these different platforms in at least one data processing format and are transmitted to the storage system 1 via at least one communication network RC through access means 101 of the platform to the storage system 1. In particular, these access means 101 to the storage system 1 may consist of one of the above-cited data-saving software applications, combined with communication means via at least one communication network, or of any type of access means enabling the platform to perform data consultations or data changes or any known operation in this area. As is known per se, the storage system 1 comprises data processing means 11 and storage resources 20, 100. These storage resources 20, 100 comprise firstly storage means 20 containing at least one physical library P20$_1$ to P20$_n$ including at least one robot P22 capable of loading and unloading at least one data storing cartridge P21$_1$ to P21$_n$ in and from at least one reader P200$_1$ to P200$_n$, and secondly comprise memory means 100, called cache 100, which include at least one virtual library V20$_1$ to V20$_n$ which temporarily stores data corresponding to data of at least one cartridge V$_1$ to V$_n$ of a physical library P20$_1$ to P20$_n$ which the storage system has under its control. The processing means 11 of the storage system 1 according to the invention, vis-à-vis computer-platforms 10$_1$ to 10$_n$, emulate at least one virtual library V20$_1$ to V20$_n$ from at least one physical library P20$_1$ to P20$_n$. In storage systems known in the prior art, when the access means 101 to the storage system 1 of one of the computer platforms 10$_1$ to 10$_n$ managed by the storage system 1, requires data reading or writing, the robot 20 allows loading of the cartridge P21$_1$ to P21$_n$ corresponding to the required data into one of the readers P200$_1$ to P200$_n$ of the physical library P20$_1$ to P20$_n$ to permit writing and reading of the data. On the other hand, in storage systems emulating a virtual library V20$_1$ to V20$_n$ from the physical library P20$_1$ to P20$_n$, as is the case in the present invention, the computer platforms 10$_1$ to ion in fact access the virtual library V20$_1$ to V20$_n$ of the cache 100 instead of directly accessing the physical library P20$_1$ to P20$_n$. Emulation therefore allows the storage system 1 to act vis-à-vis computer platforms 10$_1$ to 10$_n$ as if it effectively offers direct access to the physical library P20$_1$ to P20$_n$, but by offering quicker access to the virtual library V20$_1$ to V20$_n$. The computer platforms 10$_1$ to 10$_n$ therefore do not need to be modified and the storage system 1 takes in charge the converting of received requests in order to provide the data requested by the computer platforms 10$_1$ to 10$_n$, as if it derived from a physical library P20$_1$ to P20$_n$. Emulation may have different levels of details, going for example as far as emulating the physical library down to the last reader, but emulation allows the storage system 1 to have its own organization and it is not necessary that the organization of the libraries emulated in the cache correspond exactly to the organization of the physical libraries which the system has under its control. Therefore, when the storage system receives a request from a computer platform to mount a cartridge in a reader, it will interpret the received request and may for example simulate mounting of a cartridge in a reader to allow reading/writing of this cartridge by the computer platform, until this platform transmits a cartridge dismount request to the system. In manner known per se, the data stored in the physical library P20$_1$ to P20$_n$ is grouped into groups of determined size, called virtual volumes V$_1$ to V$_n$. These virtual volumes V$_1$ to V$_n$ of the physical library P20$_1$ to P20$_n$ can be accessed by processing means 11 of the storage system 1. Similarly, the virtual library V20$_1$ to V20$_n$ in the cache 100 of the storage system 1, temporarily and in the form of at least one group called a virtual volume V'$_1$ to V'$_n$ of the cache 100, stores data corresponding to the content of at least one virtual volume V$_1$ to V$_n$ of the library P20$_1$ to P20$_n$. Therefore, the data items of each of the virtual volumes have at least one image V$_1$ to V$_n$ in the physical library P20$_1$ to P20$_n$ and/or one image V'$_1$ to V'$_n$ in the virtual library V20$_1$ to V20$_n$, the access means 101 of the platforms 10$_1$ to 10$_n$ to the storage system 1, via the communication network RC, thereby read/write accessing the image V'$_1$ to V'$_n$ in the cache 100 of each of the virtual volumes stored by the storage system. The different components and resources of the storage system 1 such as, inter alia, the cache 100, the processing means 11 and the physical library P20$_1$ to P20$_n$ may, in manner known per se, be connected together by high data rate connections such as, for example, the optical fibres used according to the <<Fiber Channel>> protocol.

In a manner more specific to the present invention, the processing means 11 of the storage system 1 comprise a management module 30 responsible for emulating volumes V$_1$ to V$_n$ of the library into virtual volumes V'$_1$ to V'$_n$ of the cache. This management module (30) manages accessing, for reading and writing, to all the storage resources 20, 100, both to virtual volumes V$_1$ to V$_n$ of the physical library P20$_1$ to P20$_n$, and to virtual volumes V'$_1$ to V'$_n$ of the virtual library V20$_1$ V20$_n$ of the cache 100. At the time of requests transmitted by the access means 101 of the computer platforms 10$_1$ to 10$_n$ to the storage system, the management module 30 will authorize or forbid access to data in relation to demand and to the different parameters defined in an algorithm AG of management of the cache access bandwidth, implemented in the system 1. This management algorithm AG may for example be stored in a memory accessible by the processing means 11 of the system, and allows management of priorities over time for accesses to storage resources 20, 100 by the computer platforms 10$_1$ to 10$_n$ to read/write virtual volumes V'$_1$ to V'$_n$ of the cache 100, or by the system 1 itself for at least one internal operation, called a cache flush, allowing the copying of data from at least one virtual volume V'$_1$ to V'$_n$ of the virtual library V20$_1$ to V20$_n$ towards at least one virtual volume V$_1$ to V$_n$ of the physical library P200 to P20$_n$. The cache flush operation is called <<internal>> in opposition to accessing to the cache 100 required by the computer platforms which a priori are external to the storage system. This operation in fact corresponds to a cache management operation decided by the system itself, internally, in accordance with management algorithms of the cache 100. Similarly, the compacting of valid volumes V$_1$ to V$_n$ of the physical library P20$_1$ to P20$_n$, described further on, corresponds to an internal operation requiring access to the cache 100. The term <<internal operation>> will therefore be used herein for any operation internally decided by the system itself to manage its storage resources. During the flush operation of the cache 100, a certain number of virtual volumes V'$_1$ to V'$_n$ of the virtual library V20$_1$ to V20$_n$, eligible for flushing, are chosen so that they can be recopied into the physical library P20$_1$ to P20$_n$. The flush operation will start, in relation to available resources 20, 100, with at least one of these eligible virtual volumes V'$_1$ to V'$_n$, then when use of the resources 20, 100 so allows, it will choose other virtual volumes V'$_1$ to V'$_n$ for their recopying into the physical library P20$_1$ to P20$_n$. A flush operation of the cache 100 may therefore concern a plurality of virtual volumes V'$_1$ to V'$_n$ to be <<flushed>> (copied to the physical library) simultaneously or successively during a given flush operation, depending on the availability of resources. The start of a flush operation is determined by the activity of the system, and by cache occupancy, and the copies made during these flush operations are also controlled in relation to activity and occupancy as is explained in detail below. It is therefore possible to manage priorities over time for access to the storage resources 20, 100 by the computer platforms 10$_1$ to 10$_n$ to read/write virtual volumes V'$_1$ to V'$_n$ of the cache 100, or by the system 1 itself for at least one internal operation. Additionally, according to some embodiments, the invention comprises at least one calculation of at least one cache activity index per determined periods of time, reflecting utilization of the access bandwidth to the cache 100. In this way, the use of the cache access bandwidth (generally, use of the resources) determines accessing to the cache 100 by the computer platforms $\mathbf{10}_1$ to $\mathbf{10}_n$ or by the system 1 itself. According to some embodiments, the invention comprises at least one calculation of at least one cache occupancy rate making it possible, for example, to determine whether data can be written in the cache or if the cache must be flushed, etc. Therefore, in various embodiments, the invention allows the regulated use of the cache access bandwidth, so as to avoid any blockage or delay arising from too extensive utilization of the resources of the system 1. Also, the invention allows the occupancy of the cache 100 to be regulated, whilst managing priorities over time for accessing the resources 20,100 of the storage system 1, as is detailed below.

In some embodiments of the invention, the different means herein described can be carried by a software application run by the processing means 11 of the storage system 1. Therefore, this software application will form all the modules 30, 31, 32, 33 and 34 described herein and will be responsible for the interoperability of the different means of the storage system 1 according to the invention. This software application will cooperate with the operating system installed on the storage system 1 to manage the operations to be performed. According to the invention, the operating system of the storage system 1 may consist of any operating system which, in manner known per se, generates data representing information on at least the locations and utilization of all the data present in the storage system 1. Therefore the information generated by this operating system is used by the processing means 11 of the storage system according to the invention. For example, the operating system of the storage system 1 may consist of a system of AIX type. In this case, the data generated by this AIX system, representing information on at least the locations and utilization of all the data of this system, corresponds to a journaling system of JFS type (<<Journalized File System>>), particularly suitable for implementing the invention, although the invention can be implemented in other types of operating systems generating other types of file systems. The data required for running this application is evidently previously recorded in a memory accessible by the processing means 11 of the system 1, e.g. the memory in which the management algorithm AG is stored.

In some embodiments of the invention, the cache 100 consists of a plurality of hard disks $\mathbf{100}_1$ to $\mathbf{100}_n$ on which a plurality of partitions $P_1$ to $P_n$ is distributed. For example, the partitions $P_1$ to $P_n$ installed on these hard disks can be organized according to an array of RAID 5 type (<<Redundant Array of Inexpensive Disks>>), type 5 also being called <<Disk Array with Block-interleaved Distributed Parity>>) so as to allow repair in the event of any damage. In some embodiments of the invention, the management module 30 comprises an organization module 33 permanently updating information relating to the distribution of the partitions $P_1$ to $P_n$ installed on the hard disks and to the distribution of data recorded in the different partitions $P_1$ to $P_n$. By means of the journaling file system JFS of the operating system, the organization module 33, on the basis of this information on distribution of the partitions $P_1$ to $P_n$ and data distribution, generates at least one directory (RP) containing information on the locations and utilization of the virtual volumes $V'_1$ to $V'_n$ of the cache 100. The virtual volumes $V'_1$ to $V'_n$ of the cache 100 on which read or write operations are in progress are identified as <<open virtual volumes>> and the virtual volumes on which no reading or writing is in progress are identified as <<closed virtual volumes>>. By means of the journalized file system JFS of the operating system, this organization module 33 integrates the information indicating which virtual volumes $V'_1$ to $V'_n$ are open and which are closed, and therefore allows equitable distribution of data over the different partitions $P_1$ to $P_n$ of the cache 100. This equitable distribution of data over the different hard disks of the cache promotes homogeneous distribution of the volumes over the disks carrying the partitions, and therefore avoids heavy concentration of accesses to the disks carrying the different partitions $P_1$ to $P_n$ of the cache 100. Indeed, the hard disks $\mathbf{100}_1$ to $\mathbf{100}_n$ of the cache 100 have a limited bandwidth which means that only a limited number of simultaneous accesses are allowed to the different partitions $P_1$ to $P_n$. If several operations require access to one same disk, some operations will have to be placed on standby while the other operations are completed. Equitable distribution of data over the disks can minimize this placing on standby for access to the partitions $P_1$ to $P_n$.

In some embodiments of the invention, the management module 30 comprises access means to the content of the resources 20, 100 of the storage system 1. On accessing the storage resources (20, 100), the management module 30 can therefore verify the content of the physical library $P\mathbf{20}_1$ to $P\mathbf{20}_n$ and of the virtual library $V\mathbf{20}_1$ to $V\mathbf{20}_n$ so as to assign to each of the virtual volumes a value called a status. This status allows the management module 30 to manage the state of the virtual volumes $V'_1$ to $V'_n$ and $V_1$ to $V_n$, of the cache 100 and of the physical library $P\mathbf{20}_1$ to $P\mathbf{20}_n$ respectively. The management module 30 therefore assigns a status to each of the virtual volumes in relation to the content of the two libraries, from among at least the following statuses:

- <<disk only>> status when the virtual volume has an image $V'_1$ to $V'_n$ in the virtual library $V\mathbf{20}_1$ to $V\mathbf{20}_n$ of the cache 100, but has no image in the physical library or has at least one image $V_1$ to $V_n$ in the physical library P200 to $P\mathbf{20}_n$ which is not valid i.e. does not contain the same data as the image $V'_1$ to $V'_n$ in the virtual library $V\mathbf{20}_1$ to $V\mathbf{20}_n$;
- <<out of cache>> status when the virtual volume has no image $V'_1$ to $V'_n$ in the virtual library $V\mathbf{20}_1$ to $V\mathbf{20}_n$ of the cache 100;
- <<disk and tape>> status when the virtual volume has valid images both in the virtual library $V\mathbf{20}_1$ to $V\mathbf{20}_n$ of the cache 100 and in the physical library $P\mathbf{20}_1$ to $P\mathbf{20}_n$;
- <<swapping in>> status when the virtual volume has an image $V'_1$ to $V'_n$ in the progress of being loaded (currently being loaded) into the virtual library $V\mathbf{20}_1$ to $V\mathbf{20}_n$, from an image $V_1$ to $V_n$ in the physical library $P\mathbf{20}_1$ to $P\mathbf{20}_n$;
- <<swapping out>> status when the virtual volume has an image $V'_1$ to $V'_n$ in the virtual library $V\mathbf{20}_1$ to $V\mathbf{20}_n$ in the progress of being copied (currently being copied) in an image $V_1$ to $V_n$ of the physical library $P\mathbf{20}_1$ to $P\mathbf{20}_n$;
- <<incomplete>> status when the virtual volume $V'_1$ to $V'_n$ of the virtual library $V\mathbf{20}_1$ to $V\mathbf{20}_n$ is open and does not contain data or contains incomplete data;
- <<moving out>> status when the virtual volume $V'_1$ to $V'_n$ of the virtual library $V\mathbf{20}_1$ to $V\mathbf{20}_n$ is in the progress of being copied from one partition $P_1$ to $P_n$ of the cache 100 to another;
- <<swappable>> status when the virtual volume has an image $V'_1$ to $V'_n$ in the virtual library $V\mathbf{20}_1$ to $V\mathbf{20}_n$ of the cache 100, but has at least one image $V_1$ to $V_n$ in the physical library $P\mathbf{20}_1$ to $P\mathbf{20}_n$ which is not valid, or the image $V'_1$ to $V'_n$ in the virtual library $V\mathbf{20}_1$ to $V\mathbf{20}_n$ is in the progress of being copied into an image $V_1$ to $V_n$ of the physical library $P20_1$ to $P20_n$, i.e. the volume either has <<disk only>> or <<swapping out>> status.

In some embodiments of the invention, the management module 30 comprises a module 31 of cache activity control which calculates at least one cache activity index per determined periods of time. This cache activity index per determined time periods may, for example, correspond to the mean number of virtual volumes $V'_1$ to $V'_n$ opened in the cache 100, i.e. the virtual volumes $V'_1$ to $V'_n$ of the cache 100 on which reading or writing is in progress during a determined period of time. More precisely, the activity index may be calculated over a sliding time period i.e. by repeating the calculation of the index over several successive determined time periods and by calculating the mean of the activity indexes obtained on each of these successive time periods. Therefore, the mean calculated for several successive non-periodic activity indexes enables the calculation of the activity index to perform better by eliminating any sudden, brief variations in activity. The activity index obtained subsequent to this mean calculation is therefore smoothed (low pass filter) and truly represents the activity of the cache 100. The activity index of the cache per determined periods of time may therefore correspond to the mean, calculated over a determined number of successive determined time periods, of the mean number of virtual volumes $V'_1$ to $V'_n$ of the cache 100 simultaneously opened during each determined time period. The management module 30 can therefore monitor the activity of the cache 100 by triggering this calculation periodically or at different points in time when space is allocated for a new virtual volume $V'_1$ to $V'_n$ in the cache 100.

In some embodiments of the invention, the management module 30 also comprises a module 32 of cache occupancy control which calculates at least one cache occupancy rate at a given time. More precisely, this given time may be determined in relation to the operations performed by the storage system 1. For example, this calculation of occupancy rate may take place whenever a system operation translates as (results in) a closure of a virtual volume $V'_1$ to $V'_n$ of the cache 100 and/or by the end of a flush operation of the cache 100, and/or during a flush operation, when copying of a virtual volume $V'_1$ to $V'_n$ of the cache 100 is completed and/or there is new allocation of storage space in the cache 100 to define a virtual volume $V'_1$ to $V'_n$ of the cache. It will be noted in passing that the opening of a virtual volume $V'_1$ to $V'_n$ of the cache 100 results in the defining of the maximum space reserved for virtual volumes $V'_1$ to $V'_n$ in the cache 100, so that the platform which requested opening of a virtual volume $V'_1$ to $V'_n$ is able to record data therein having the size of a whole virtual volume $V'_1$ to $V'_n$, and on the closing of this virtual volume $V'_1$ to $V'_n$ of the cache 100, if this virtual volume is not complete i.e. it does not contain as much data as is possible, the storage system 1 allocates only the necessary size to this virtual volume $V'_1$ to $V'_n$ instead of maintaining for it the maximum size possible for virtual volumes $V'_1$ to $V'_n$. The management module 30 is therefore able to monitor occupancy of the cache 100 by triggering this calculation periodically or on an ad hoc basis whenever space is allocated for a new virtual volume $V'_1$ to $V'_n$ in the cache 100, the closing of a volume not necessarily requiring an estimation of occupancy of the cache 100.

In some embodiments of the invention, the module 32 of cache occupancy control calculates two different occupancy rates. It calculates firstly a so-called individual occupancy rate, corresponding to calculation of the occupancy rate on each of the partitions $P_1$ to $P_n$ of the cache 100 individually, and secondly a so-called mean occupancy rate corresponding to calculation of the occupancy rate of all the partitions $P_1$ to $P_n$ of the cache 100. In the embodiments in which the management module 30 assigns a status to the virtual volumes, the mean occupancy rate of the cache 100 may, for all the partitions $P_1$ to $P_n$ of the cache 100, correspond to the sum of the size of the data present in the closed virtual volumes $V'_1$ to $V'_n$ having <<disk only>> status and the size allocated to the open virtual volumes $V'_1$ to $V'_n$, irrespective of their status, this sum being compared with the total size available in all the partitions $P_1$ to $P_n$ of the cache 100, to obtain the mean occupancy rate of all the partitions $P_1$ to $P_n$ of the cache 100. Similarly, the individual occupancy rate of each partition $P_1$ to $P_n$ of the cache 100 at a given time may, for each of the partitions $P_1$ to $P_n$ of the cache 100 individually, correspond to the size of the data present in the virtual volumes $V'_1$ to $V'_n$ having <<disk only>> status, whether they are open or closed, this size being compared, for each partition $P_1$ to $P_n$, with the total available size in the partition $P_1$ to $P_n$ under consideration, to obtain the individual occupancy rate of each partition $P_1$ to $P_n$. In the embodiments in which the management module 30 does not assign a status to the virtual volumes, the cache occupancy rates may correspond either to the total size of the data present only in the closed virtual volumes $V'_1$ to $V'_n$ in the cache 100, or to the total size of the data present both in the closed virtual volumes $V'_1$ to $V'_n$ and in the open virtual volumes $V'_1$ to $V'_n$.

In relation to the algorithm AG of management of the cache access bandwidth, the management module 30 uses the results of the calculations performed by the modules 31 and 32 controlling cache activity and cache occupancy respectively, so as to manage accessing to the storage resources 20, 100 of the system 1. Access to the cache 100 may evidently be requested by the computer platforms $10_1$ to $10_n$ to read/write virtual volumes $V'_1$ to $V'_n$, but also by the system 1 itself for a flush operation of all or part of the cache 100 towards the physical library $P20_1$ to $P20_n$. In this way the algorithm AG managing the bandwidth for access to the cache 100 is able to give priority over time to the different accesses to the storage resources 20, 100 required for the different operations which can be performed by the system 1 according to the invention. More precisely, the management module 30 compares the activity index of the cache with a minimum activity threshold and a maximum activity threshold, compares the individual occupancy rate of the different partitions $P'_1$ to $P'_n$ of the cache 100 with a maximum occupancy threshold, and compares the mean occupancy rate of the cache 100 with a first threshold, called a priority threshold, below which occupancy of the cache 100 has priority over flushing, and a second threshold, called a flush start threshold, above which flushing of the cache 100 can be performed. This comparison enables the management module 30 to manage accesses to the caches 100 by means of the algorithm AG managing the bandwidth for cache access. In some embodiments of the invention, the management algorithm AG preferably comprises all the rules described below, but more generally at least one of these rules. The invention also makes provision for the possible modification of these different rules through parameterisation of the management algorithm AG.

One first rule provides that if the value of the individual occupancy rate of a partition $P_1$ to $P_n$ of the cache 100 is higher than the value of the maximum occupancy threshold, irrespective of the value of the activity index of the cache 100, the flush operation of the cache 100 is essential and is authorized to start, to the possible detriment of cache accessing by the computer platforms $10_1$ to $10_n$, part of the access bandwidth to the cache 100 then being used for copying one or more virtual volumes $V'_1$ to $V'_n$ from this partition $P_1$ to $P_n$ into the physical library $P20_1$ to $P20_n$ during this flush operation.

Another rule provides that if the value of the activity index of the cache 100 is less or equal to the value of the minimum activity threshold, any flush operation of the cache 100 is authorized to start for the copying of one or more virtual volumes $V'_1$ to $V'_n$ into the physical library P20$_1$ to P20$_n$.

Another rule provides that if the value of the activity index of the cache 100 lies between the value of the minimum activity threshold and the value of the maximum activity threshold, a flush operation of the cache 100 already in progress is authorized to continue, the copying of one or more virtual volumes $V'_1$ to $V'_n$ from the cache 100 to the physical library P20$_1$ to P20$_n$ being authorized during this flush operation is progress, but if no flush operation is in progress a new flush operation of the cache 100 is not authorized to start. Therefore, a new flush operation of the cache 100 will not be authorized to start, only flush operations already in progress being authorized to continue, and the copying of virtual volumes of the cache 100 chosen to be eligible for flushing during this operation will be authorized. Also, these conditions set by the activity indexes may be lifted (cleared, broken) by conditions fixed by the individual and mean occupancy rates, i.e. a new flush operation will be authorized to start if the individual occupancy rate exceeds the maximum occupancy threshold or if the mean occupancy rate exceeds the flush start threshold.

Another rule provides that if the value of the activity index of the cache 100 is higher than the value of the maximum activity threshold, a new flush operation of the cache 100 is not authorized to start, and a flush operation of the cache 100 already in progress is interrupted to the benefit of cache accessing by the computer platforms 10$_1$ to 10$_n$, unless the value of the individual occupancy rate of the cache 100 is higher than the value of the maximum occupancy threshold or unless the value of the mean occupancy rate of the cache 100 is higher than the flush start threshold, any new copying of one or more virtual volumes $V'_1$ to $V'_n$ of the cache 100 into the physical library P20 P20$_n$, during a flush operation already in progress, being forbidden, whilst the copying already in progress of one or more virtual volumes $V'_1$ to $V'_n$ of the cache 100 into the physical library P20$_1$ to P20$_n$, during this flush operation in progress, is authorized to be completed. Therefore, as previously, these conditions set by the activity indexes can be lifted by the conditions fixed by the individual and mean occupancy rates, i.e. if the value of the individual occupancy rate or mean occupancy rate of the cache 100 is higher than the value of the maximum occupancy threshold or the flush start threshold respectively, a new flush operation of the cache 100 may take place.

Another rule provides that if the value of the mean occupancy rate of all the partitions $P_1$ to $P_n$ of the cache 100 is less or equal to the value of the priority threshold, access to the storage resources 20,100 in reply to requests transmitted by the access means 101 of the computer platforms 10$_1$ to 10$_n$ to access the storage system 1 have priority over accesses needed to copy volumes (1) requiring the same resources 20, 100 during a flush operation of the cache 100, this copying possibly being deferred until release of these resources 20, 100.

Another rule provides that if the value of the mean occupancy rate of all the partitions $P_1$ to $P_n$ of the cache 100 is higher than the priority threshold, accesses to the storage resources 20, 100 in reply to requests transmitted by the access means 101 of the computer platforms 10$_1$ to 10$_n$, to access the storage system 1, do not have priority over accesses needed for copying which require the same resources 20, 100 during a flush operation of the cache 100, this flush operation can therefore start or continue to the possible detriment of accessing to the storage resources 20, 100 by the computer platforms 10$_1$ to 10$_n$.

Another rule provides that if the value of the mean occupancy rate of all the partitions $P_1$ to $P_n$ of the cache 100 is less or equal to the value of the flush start threshold, a flush operation of the cache 100 towards the physical library P20$_1$ to P20$_n$ is only authorized to start if the value of the activity index of the cache 100 is less or equal to the minimum activity threshold.

Another rule provides that if the value of the mean occupancy rate of all the partitions $P_1$ to $P_n$ of the cache 100 is higher than the value of the flush start threshold, a flush operation of the cache 100 towards the physical library P20$_1$ to P20$_n$ is essential and is authorized to start.

In addition, the algorithm may, in one variant of embodiment, have been previously parameterised so that the maximum occupancy threshold and the flush start threshold have the same value and are in fact one same threshold which determines flush start. The calculations of the individual and mean occupancy rates therefore provide precise control over the operations performed by the system 1 in relation to the utilization of the different partitions of the cache 100. The system therefore provides flexibility of use enabling an operator to fix different values for the thresholds and to control the different operations performed in relation to the parameters chosen by the operator in the management algorithm.

These different rules and the parameterisation of the algorithm and thresholds allow flexible use of the system, and an operator in charge of parameterisation may for example choose to fix the priority threshold at a zero value so that occupancy never has priority over flushing. Similarly, the parameterisation of the thresholds allows a priority threshold for example to be fixed at higher value than the value of the flush start threshold, so that when the mean occupancy rate exceeds the flush start threshold of the cache a flush operation is authorized to start, but occupancy of the cache continues to have priority over flushing. Conversely, the priority threshold may be fixed at a lower value than the flush start threshold, so that when the mean occupancy rate exceeds the priority threshold, a cache flush operation has priority over occupancy, and if the flush start threshold is reached the flush operation becomes essential and will be triggered immediately having priority over occupancy.

The invention therefore permits numerous different operating functions but essentially, and in general insofar as is possible, gives preference to access to the resources by the computer platforms.

Finally, the algorithm is preferably parameterised such as explained above, so that if the activity index is less or equal to the minimum activity threshold, a cache flush operation can be started irrespective of the values of the occupancy rates, if there are closed virtual volumes having <<disk only>> status, eligible for flushing from the cache 100. However, parameterisation may be different and require a given occupancy rate to allow the start of a flush operation. In addition, it will be noted here that the rules fixed in relation to the values of indexes and rates were fixed under a relationship of type <<less or equal to>> and higher than>>, but evidently the relationship may be of the type <<lower than>> and <<greater or equal to>> or any combination of these relationships, without departing from the spirit of the invention.

In some embodiments of the invention, the organization module 33 cooperates with the module 31 of cache activity control and the module 32 of cache occupancy control, in order to distribute data equitably over the different partitions $P_1$ to $P_n$ of the cache 100, so as to promote homogeneous distribution of the virtual volumes over all the disks carrying the different partitions $P_1$ to $P_n$ of the cache 100. Therefore, by means of this cooperation, the management module 30 allows the equitable distribution of data over the different partitions $P_1$ to $P_n$ of the cache 100 to be performed solely when the activity and occupancy of the cache 100 so permit. The module 31 of cache activity control comprises means for consulting the information generated by the organization module 33. By consulting the information generated by the organization module 33, the module 31 of cache activity control can therefore calculate the activity index of the cache 100 by counting the number of open virtual volumes $V'_1$ to $V'_n$ in the cache 100. The minimum activity threshold corresponds to an activity value for which it is considered that the resources 20, 100 of the system 1 are under-exploited, or exploited at a sufficiently low level to allow flush operations of the cache 100 to be performed. The system 1 can then internally, i.e. by itself, without action by the computer platforms, launch flush operations of the cache 100. These flush operations of the cache 100 consist of a group of copying operations of virtual volumes $V'_1$ to $V'_n$ having <<disk-only>> status, in parallel with accessing by the computer platforms which, if the activity index falls to below the minimum activity threshold, are sufficiently few in number to allow at least one flush operation to be performed without running the risk of limiting access to the cache by the computer platforms. As for the maximum activity threshold, this corresponds to the total number of virtual volumes $V'_1$ to $V'_n$ of the cache which, when they opened at the same time, consume a fraction of the bandwidth that is considered too high to allow the start of an internal operation requiring access to the cache. The value of this threshold is therefore previously chosen to avoid creating any conflicting of access to the different partitions $P_1$ to $P_n$ of the cache 100. Similarly, the module 32 of cache occupancy control, controlled by the management module 30, comprises means for consulting the information generated by the organization module 33 to calculate firstly the mean occupancy rate of the cache 100 and secondly the individual occupancy rate of each of the partitions $P_1$ to $P_n$ of the cache 100. As mentioned previously, controlling of the content of the physical and virtual libraries by the management module 30 allows the assignment of statuses to the virtual volumes which are used for calculations of occupancy rates by the module 32 controlling the occupancy of the cache 100.

In some embodiments of the invention, the management module 30, during the flush operation of the cache 100, uses the results of the calculations performed by the module 32 controlling cache occupancy to choose the virtual volumes $V'_1$ to $V'_n$ of the cache 100 to be copied into the physical library $P20_1$ to $P20_n$. The virtual volumes $V'_1$ to $V'_n$ of the cache 100 thus selected for a flush operation are closed virtual volumes $V'_1$ to $V'_n$ having <<disk only>> status since they are not in the progress of being used (not currently used) and do not have an image in the physical library or have at least one image in the physical library which is not valid. In some particularly advantageous embodiments, this selection may be made in accordance with a so-called LRU rule (<<Less Recently Used>>). The virtual volumes $V'_1$ to $V'_n$ selected in accordance with this rule are the virtual volumes $V'_1$ to $V'_n$ the less recently accessed, for reading or writing, by the partition $P_1$ to $P_n$ of the cache 100 if the value of individual occupancy rate of this partition is greater or equal to the value of the maximum occupancy threshold, or by the all the partitions $P_1$ to $P_n$ of the cache 100 if the values of the individual occupancy rates of all the partitions are lower than the maximum occupancy threshold.

In some embodiments of the invention, the management module 30 also comprises a module 34 of activity control of the physical library $P20_1$ to $P20_n$. This module 34 controlling the activity of this library permanently updates information at least on the utilization of the readers $P200_1$ to $P200_n$ and/or of the cartridges $P21_1$ to $P21_n$ of the libraries $P20_1$ to $P20_n$ under the control of the storage system 1. This information is used by the management module 30 to manage priorities over time for access to the storage resources 20, 100, particularly in relation to the availability of the readers $P200_1$ to $P200_n$ and/or cartridges $P21_1$ to $P21_n$. Firstly this module 34 therefore permits the regulation of accesses to the storage resources 20, 100 by the system 1 itself for a flush operation of the cache 100 towards the physical library $P20_1$ to $P20_n$. Secondly, this module 34 also allows regulation of accesses to the storage resources 20, 100 by the computer platforms $10_1$ to $10_n$ to read/write a virtual volume $V'_1$ to $V'_n$ not present in the cache 100 and therefore requiring consultation of the physical library $P20_1$ to $P20_n$ for the copying of a virtual volume $V_1$ to $V_n$ from this physical library $P20_1$ to $P20_n$ to the cache 100, in the form of a virtual volume $V'_1$ to $V'_n$ of the virtual library $V20_1$ to $V20_n$.

In some embodiments of the invention, the management module 30, through its access means to the content of the storage resources 20, 100, permanently updates information on at least the validity of the volumes $V_1$ to $V_n$ present in the cartridges $P21_1$ to $P21_n$ of the physical libraries $P20_1$ to $P20_n$ under the control of the storage system 1. The management module 30 therefore permanently verifies that the data present in the library is up to date relative to any virtual volumes $V'_1$ to $V'_n$ which may have been modified in the cache 100 by the computer platforms $10_1$ to $10_n$. This management module 30 responsible for emulating virtual volumes $V_1$ to $V_n$ of the physical library $P20_1$ to $P20_n$ into virtual volumes $V'_1$ to $V'_n$ of the virtual library $V20_1$ to $V20_n$ of the cache, offers the possibility that a virtual volume $V'_1$ to $V'_n$ of the cache 100 may have multiple images $V_1$ to $V_n$ in the physical library $P20_1$ to $P20_n$ but, by assigning statuses to the virtual volumes, allows the virtual volumes $V'_1$ to $V'_n$ of the cache 100 which will be taken into account by the module 32 controlling cache occupancy, for calculation of occupancy rate, to be only those which correspond to the virtual volumes $V'_1$ to $V'_n$ of the cache 100 whose images $V_1$ to $V_n$ present in the physical library $P20_1$ to $P20_n$ are not all valid (volumes having <<disk only>> status). This information on validity enables the management module 30 to compare the number of obsolete virtual volumes $V_1$ to $V_n$ in the cartridges $P21_1$ to $P21_n$ of the physical library $P20_1$ to $P20_n$ with a maximum invalidity threshold. Therefore, when this space occupied by these obsolete virtual volumes $V_1$ to $V_n$ reaches this threshold, the management module 30 carries out compacting of the valid volumes $V_1$ to $V_n$ of the physical library $P20_1$ to $P20_n$, in the cartridges $P21_1$ to $P21_n$ containing virtual volumes $V_1$ to $V_n$ that are not used in the physical library $P20_1$ to $P20_n$ and/or corresponding to closed virtual volumes $V'_1$ to $V'_n$ in the cache100. This compacting is performed by the management module 30 by controlling the reading of all the valid volumes $V_1$ to $V_n$ in the source cartridges $P21_1$ to $P21_n$ containing obsolete volumes $V_1$ to $V_n$ and the simultaneous copying of these valid volumes $V_1$ to $V_n$ into target cartridges $P21_1$ to $P21_n$, so as to delete these source cartridges $P21_1$ to $P21_n$ and obtain only cartridges $P21_1$ to $P21_n$ containing valid volumes V: to $V_n$ in the physical library $P20_1$ to $P20_n$. In addition, in some embodiments of the invention, the management module 30 uses the results of the operations performed by the module 31 controlling cache activity and the module 32 controlling cache occupancy, so as to update the data in the cartridges $P21_1$ to $P21_n$ of the library $P20_1$ to $P20_n$, in relation to the activity and occupancy of the cache 100. Therefore, this compacting of data in the cartridges $P21_1$ to $P21_n$ may be made by giving preference to accesses to the storage resources 20, 100 by the computer platforms $10_1$ to $10_n$ over the accessing required for compacting. For example, this compacting may possibly only take place if few accesses to the physical storage resources 20 are made during a determined time period. The management module 30 may, in some embodiments of the invention, compare the number of obsolete volumes $V_1$ to $V_n$ in the cartridges $P21_1$ to $P21_n$ of the physical library $P20_1$ to $P20_n$ with a maximum invalidity threshold. If this threshold is exceeded, the management module 30 will perform compacting of the valid virtual volumes $V_1$ to $V_n$ of the physical library. Therefore, the source cartridges $P21_1$ to $P21_n$ containing invalid volumes will be erased and only those cartridges $P21_1$ to $P21_n$ will remain which contain valid volumes $V_1$ to $V_n$, placed end to end for example so as to save storage space which, up until then, was wasted by invalid or deleted volumes.

Figure 2:
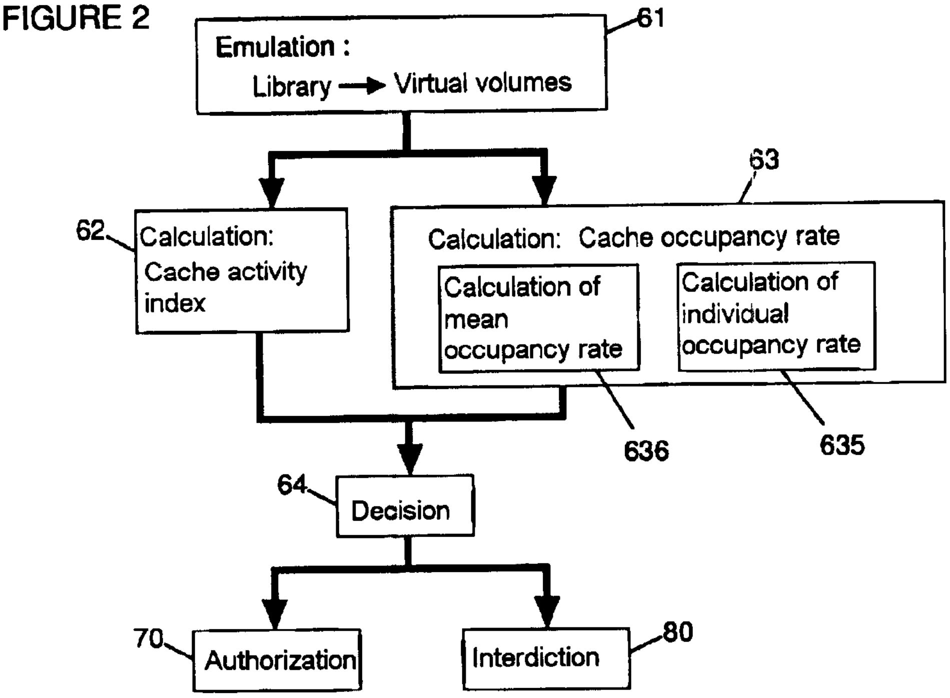
FIG. 2 illustrates the main steps of the method according to one embodiment of the invention.
Figure 3:
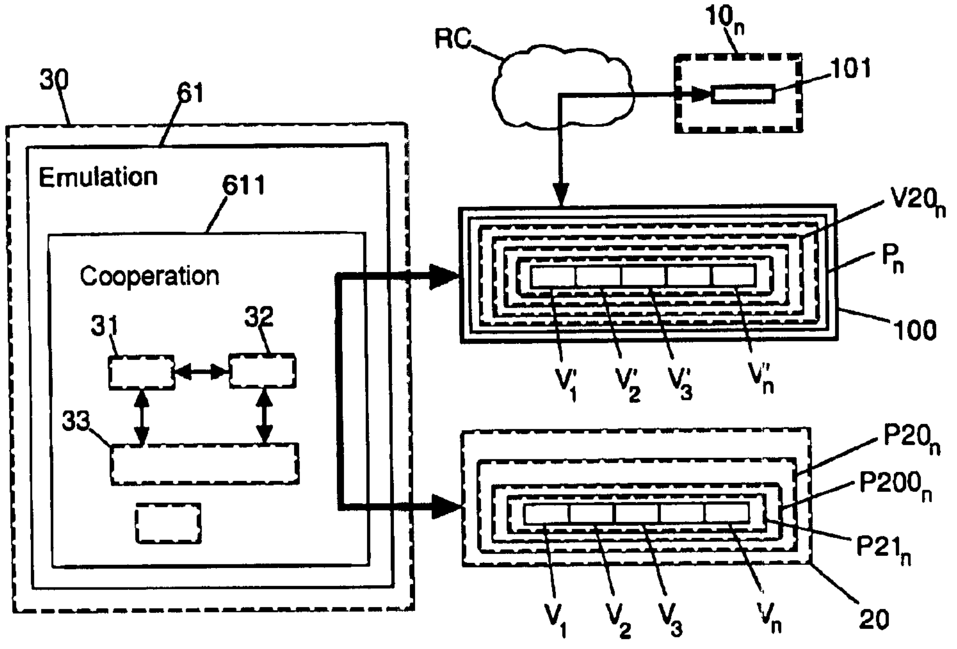
FIG. 3 shows the details of the emulation step such as implemented in the system, according to one embodiment of the invention.
Figure 4:
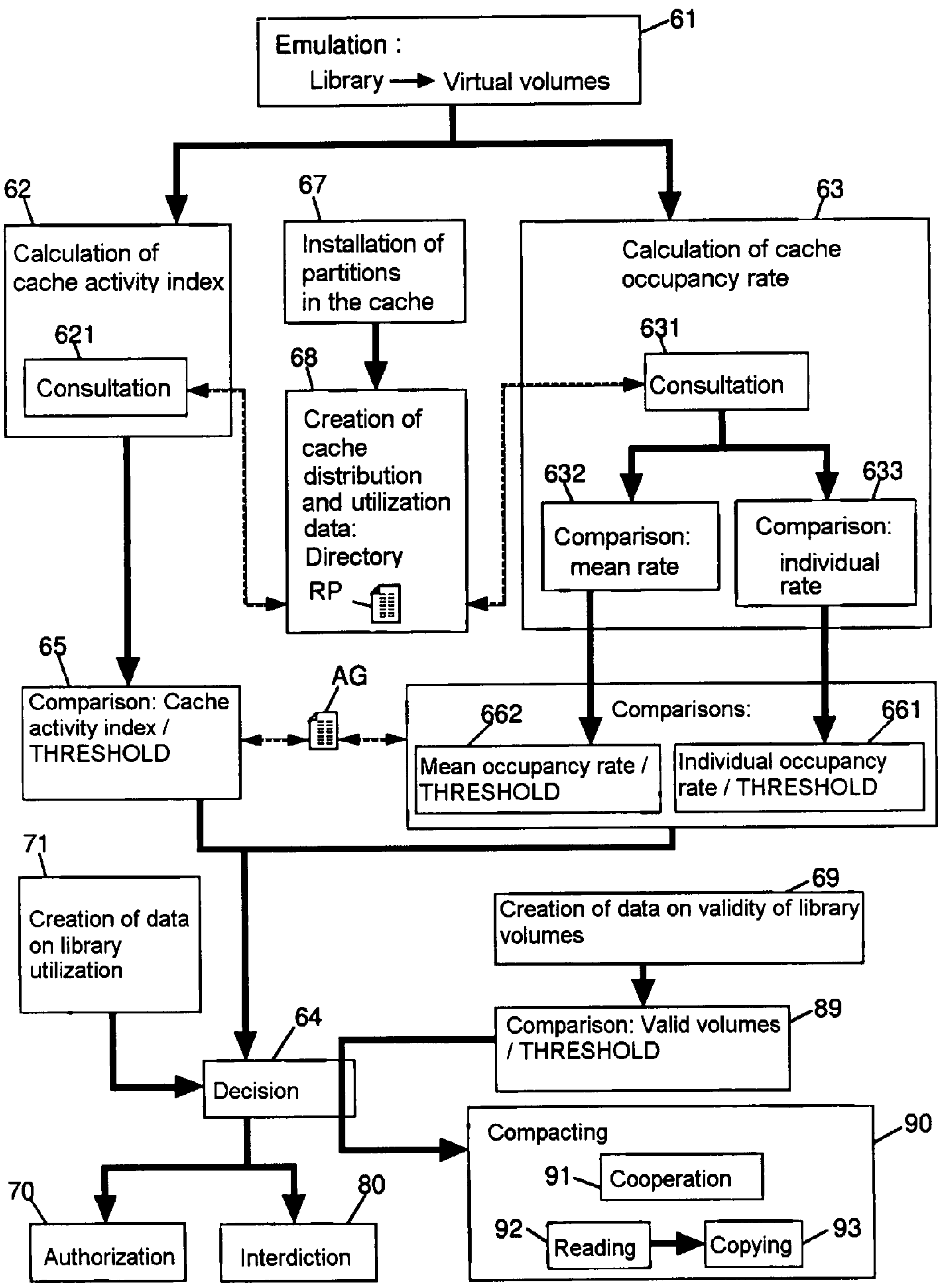
FIG. 4 shows the detailed steps of the method according to one embodiment of the invention.

The method of the invention will now be described with reference to FIGS. 2 to 4. The method of the invention is implemented by a storage system 1 of the type described above. This method comprises at least the following steps:

- emulating (61) virtual volumes $V_1$ to $V_n$ of the physical library $P20_1$ to $P20_n$ into virtual volumes $V'_1$ to $V'_n$ of the virtual library $V20_1$ to $V20_n$ of the cache 100, by a management module 30 present in the processing means 11 of the storage system 1 and managing accesses to the storage resources 20, 100 both to virtual volumes $V_1$ to $V_n$ of the physical library $P20_1$ to $P20_n$ and to virtual volumes $V'_1$ to $V'_n$ of the cache 100, in relation to requests transmitted by the access means 101 of the computer platforms $10_1$ to $10_n$ to the storage system 1;
- calculating (62), by a module 31 of cache activity control, at least one activity index of the cache 100 per determined period of time, this calculation step (62) being repeated to monitor changes in the activity of the cache 100 periodically or, on an ad hoc basis, whenever space is allocated for a new virtual volume $V'_1$ to $V'_n$ in the cache 100;
- calculating (63), by a module 32 of cache occupancy control, at least one occupancy rate of the cache 100 at a given time, this calculation step (63) being repeated to monitor changes in occupancy of the cache 100 periodically or, on an ad hoc basis, whenever space is allocated for a new virtual volume $V'_1$ to $V'_n$ in the cache 100;
- deciding (64), by the management module 30, in relation to the result of these calculations and of at least one algorithm AG of management of the access bandwidth to the cache 100, and implemented in the storage system 1, between authorization (70) or interdiction (80) to access the storage resources 20, 100 either by the computer platforms $10_1$ to ion to read/write virtual volumes $V'_1$ to $V'_n$ in the cache 100, or by the system 1 itself for at least one operation, called a cache flush operation, allowing copying of the data of at least one virtual volume $V'_1$ to $V'_n$ from the virtual library $V20_1$ to $V20_n$ towards at least one virtual volume $V_1$ to $V_n$ of the physical library $P20_1$ to $P20_n$.

Prior to implementing the above-described steps, the method may integrate at least one installation step (67) to install a plurality of partitions $P_1$ to $P_n$ on a plurality of hard disks $100_1$ to $100_n$ forming the cache 100. Additionally, as mentioned previously, the system may comprise an organization module 33 in which case the method comprises at least one step (68) to create and update data representing information on the distribution of the partitions $P_1$ to $P_n$ and the distribution of the data recorded on the different partitions $P_1$ to $P_n$. The organization module 33, on the basis of this information, generates at least one directory RP containing information on the locations and utilization of the virtual volumes $V'_1$ to $V'_n$, the virtual volumes $V'_1$ to $V'_n$ on which reading or writing is in progress being identified as "open" virtual volumes, and the virtual volumes on which no reading or writing is in progress being identified as "closed" virtual volumes. Additionally, as mentioned previously, the management module 30 comprises access means to the content of the physical $P20_1$ to $P20_n$ and virtual $V20_1$ to $V20_n$ libraries. These access means enable the management module 30 to assign a status to each of the virtual volumes from among the above-described statuses. This information grouped together by the management module 30 is used to determine whether the different virtual volumes are present both in the virtual library $V20_1$ to $V20_n$ and in the physical library $P20_1$ to $P20_n$, and to know whether the different images of the virtual volumes are valid and whether the images $V'_1$ to $V'_n$ in the virtual library $V20_1$ to $V20_n$ are or are not being utilized.

In the embodiments in which all the modules 30, 31, 32, 33 and 34 are carried by a software application run on the processing means 11 of the storage system 1, the method evidently comprises an installation step of this software application in the operating system of the storage system 1, by recording the data required for running this application in a memory accessible by the processing means 11 of the system 1. As explained above, this software application will be responsible for the interoperability of the different means of the system 1 and may itself form all the modules 30, 31, 32, 33 and 34 of the system 1.

In some embodiments of the invention, the calculation step (62) to calculate the activity index of the cache 100 per determined periods of time consists of calculating a mean, over a determined number of successive determined periods of time, of the maximum number of virtual volumes $V'_1$ to $V'_n$ of the cache 100 that are simultaneously opened during each determined period of time. For example, the calculation can be made over 3 successive period of time and the module 31 of cache activity control, controlling the activity of the cache 100, will therefore repeat 3 times the measuring of the number of virtual volumes $V'_1$ to $V'_n$ of the cache 100 on which reading or writing is in progress during each of these 3 successive periods of time. Afterwards, the module 31 controlling cache activity will calculate the mean of the 3 values obtained to obtain a mean number of opened volumes representing the reality, since any sudden variations will have been smoothed by this mean calculated over several successive periods. More simply, this calculation could also be made over a single period, but it would be less representative of the reality and might not allow proper estimation of the activity of the cache 100.

In some embodiments of the invention, the step (63) to calculate the occupancy rate of the cache 100 at a given time, by the module 32 of cache occupancy control, controlling occupancy of the cache 100, comprises firstly a step (635) to calculate a so-called individual occupancy rate corresponding to calculation of the occupancy on each of the partitions $P_1$ to $P_n$ of the cache 100 individually, and secondly a step (636) to calculate a so-called mean occupancy rate corresponding to calculation of the occupancy rate of all the partitions $P_1$ to $P_n$ of the cache 100. In the embodiments in which the management module 30 assigns statuses to the virtual volumes, this step (636) calculating a mean occupancy rate of the cache 100, by module 32 controlling occupancy of the cache 100, consists of measuring for all partitions $P_1$ to $P_n$ of the cache 100, the sum of the total size of the data present in the closed virtual volumes $V'_1$ to $V'_n$ having <<disk only>> status, and the size allocated to the opened virtual volumes $V'_1$ to $V'_n$, irrespective of their status, this sum being compared to the total size available in all the partitions $P_1$ to $P_n$ of the cache 100, to obtain the mean occupancy rate of all the partitions $P_1$ to $P_n$ of the cache 100. Similarly, step (635) to calculate the individual occupancy rate of each partition $P_1$ to $P_n$ of the cache 100, by module 32 controlling occupancy of the cache 100, in this embodiment, consists of measuring for each of the partitions $P_1$ to $P_n$ of the cache 100 individually the total size of the data present in the virtual volumes $V'_1$ to $V'_n$ having <<disk only>> status, whether they are open or closed, this size being compared to the total size available in the partition $P_1$ to $P_n$ of the cache 100 under consideration, to obtain the mean occupancy rate of each of the partitions $P_1$ to $P_n$ of the cache 100.

In some embodiments of the invention, the method also comprises at least one comparison step (65) of the cache activity index with a minimum activity threshold and a maximum activity threshold, a comparison step (661) of the individual occupancy rate of the cache with the maximum occupancy threshold and a comparison step (662) of the mean occupancy rate with a first threshold, called a priority threshold below which occupancy of the cache 100 has priority over flushing, and a second threshold called a flush start threshold above which flushing of the cache 100 can be performed. These comparison steps are implemented by the management module 30 to manage accesses to the cache 100 by means of the cache's access bandwidth management algorithm AG, managing the access bandwidth to the cache 100, implemented in the storage system 1 as explained previously, for the management rules in relation to the different thresholds. These rules and the parameterisation of the algorithm described previously will not be further detailed here. The calculations of the activity index and individual and mean occupancy rates allow precise control over the operations performed by the system 1 in relation to the utilization of the different partitions of the cache 100. The system therefore provides flexible utilization enabling an operator to fix different values for the thresholds and to control the different internal operations performed in relation to the values of the thresholds and parameters chosen in the management algorithm. In the embodiments of the invention in which the system comprises an organization module 33, step (62) to calculate the activity index of the cache 100, by the module 31 of cache activity control, comprises at least one consultation step (621) of the data generated by the organization module 33 in order to calculate the activity of the cache by counting the number of virtual volumes opened in the cache 100. The maximum activity threshold corresponds to the total number of virtual volumes $V'_1$ to $V'_n$ of the cache 100 which, when they are opened at the same time, consume a fraction of the access bandwidth to the cache 100 that is considered too high to allow the start of an operation requiring access to the cache 100. When this threshold is reached, an operation requiring access to the cache 100 risks saturating the bandwidth or setting up conflicting access to the different partitions $P_1$ to $P_n$ of the cache 100. Similarly, step (63) to calculate the occupancy rate of the cache 100, by the module 32 of cache occupancy control, comprises at least one consultation step (631) of the data generated by the organization module 33, to know the number of open and closed virtual volumes and to calculate the occupancy rates as explained above. In the embodiments in which the management module 30 assigns statuses to the virtual volumes, this consultation step (631) enables the module 32 of cache occupancy control to calculate firstly the mean occupancy rate of the cache 100 by comparing (632) the sum, for all partitions $P_1$ to $P_n$ of the cache 100, of the total size of the data present in the open virtual volumes $V'_1$ to $V'_n$, irrespective of their status, and the size of the data present in the closed virtual volumes $V'_1$ to $V'_n$ having <<disk only>> status, with the total storage capacity of all the partitions $P_1$ to $P_n$ of the cache 100. This consultation step (631) enables the module 32 of cache occupancy control to calculate also the individual occupancy rate of each of the partitions $P_1$ to $P_n$ of the cache 100 by comparing (633), for a given partition $P_1$ to $P_n$, the size of the data present in the virtual volumes $V'_1$ to $V'_n$ having <<disk only>> status, whether they are opened or closed, with the total storage capacity of this partition $P_1$ to $P_n$ of the cache 100. In addition, the emulation step (61) of the virtual volumes $V'_1$ to $V'_n$ by the management module 30 may comprise a cooperation step (611) between the organization module 33 and module 31 of cache activity control and module 32 of cache occupancy control, so as to distribute data equitably over the different partitions $P_1$ to $P_n$ of the cache 100, in order to promote homogeneous distribution of the virtual volumes $V'_1$ to $V'_n$ over the disks carrying the different partitions $P_1$ to $P_n$ of the cache 100. This distribution also avoids heavy concentrations of access to the different disks carrying the different partitions $P_1$ to $P_n$ of the cache 100.

In some embodiments, the flush operation of the cache 100 results from the use, by the management module 30, of the results of the calculations performed by module 32 of cache occupancy control, so as to select those virtual volumes $V'_1$ to $V'_n$ of the cache 100 to be copied into the physical library $P20_1$ to $P20_n$). The virtual volumes $V'_1$ to $V'_n$ of the cache 100 thus selected for a flush operation are closed virtual volumes $V'_1$ to $V'_n$ having <<disk only>> status since they are not in the progress of being used and they do not have an image in the physical library or have at least one image in the physical library which is not valid. In some particularly advantageous embodiments, the virtual volumes $V'_1$ to $V'_n$ thus selected are the less recently accessed virtual volumes $V'_1$ to $V'_n$, for reading or writing, by the computer platforms $10_1$ to $10_n$, either in a given partition $P_1$ to $P_n$ of the cache 100 if the value of the individual occupancy rate of this partition is greater or equal to the value of maximum occupancy threshold, or in all the partitions $P_1$ to $P_n$ of the cache 100 if the values of the individual occupancy rates of all the partitions are lower than the value of the maximum occupancy threshold.

In the embodiments in which the management module 30 comprises a module 34 controlling the activity of the library, the method comprises at least one step (71) to create and update data representing information on the utilization of readers and/or of the cartridges of the libraries $P20_1$ to $P20_n$ under the control of the storage system 1. As explained previously, this information enables the management module 30 to manage priorities over time for accesses to the storage resources 20, 100, firstly by the system 1 itself for a flush operation of the cache 100 towards the physical library P20, to $P20_n$, and secondly by the computer platforms $10_1$ to $10_n$ to read/write a virtual volume $V'_1$ to $V'_n$ not present in the cache 100 and therefore requiring consultation of the physical library $P20_1$ to $P20_n$ to copy a volume $V_1$ to $V_n$ from this physical library $P20_1$ to $P20_n$ to the cache 100, in the form of a virtual volume $V'_1$ to $V'_n$ of the virtual library $V20_1$ to $V20_n$.

In the embodiments in which the management module 30 comprises means for accessing the content of the storage resources 20, 100 of the storage system 1, the management module 30 can conduct at least step (69) to create and update data representing information on the validity of the volumes $V_1$ to $V_n$ present in the cartridges $P21_1$ to $P21_n$) of the libraries P20$_1$ to P20$_n$ under the control of the storage system 1, with respect to any virtual volumes $V_1$ to $V_n$ which may have been modified in the cache 100 by the computer platforms 10$_1$ to 10$_n$. This information on validity allows the management module 30 to implement a comparison step (89) of the space occupied by the obsolete volumes $V_1$ to $V_n$ in the cartridges P21$_1$ to P21$_n$ of the physical library P20$_1$ to P20$_n$ with a maximum invalidity threshold. When the space occupied by these obsolete virtual volumes physique $V_1$ to $V_n$ reaches this threshold, the management module 30 performs a compacting step (90) of the valid volumes $V_1$ to $V_n$ in the physical library P20$_1$ to P20$_n$. Therefore the management module 30 is able to carry out compacting of valid volumes $V_1$ to $V_n$, taken from cartridges P21$_1$ to P21$_n$ containing non-utilized volumes $V_1$ to $V_n$ and/or corresponding to closed virtual volumes $V'_1$ to $V'_n$, by controlling a reading (92) of all the valid volumes $V_1$ to $V_n$ of the source cartridges P21$_1$ to P21$_n$ containing obsolete volumes $V_1$ to $V_n$ and simultaneously a copying (93) of these valid volumes $V_1$ to $V_n$ into target cartridges P21$_1$ to P21$_n$, so as to erase these source cartridges P21$_1$ to P21$_n$ and only obtain cartridges P21$_1$ to P21$_n$ containing valid volumes $V_1$ to $V_n$ in the physical library P20$_1$ to P20$_n$.

As mentioned previously, the emulation step (61) of the virtual volumes $V_1$ to $V_n$ of the physical library P20$_1$ to P20$_n$ into virtual volumes $V'_1$ to $V'_n$ of the virtual library V20$_1$ to V20$_n$ of the cache 100, and the management steps of the cache 100 by the management module 30 offer the possibility that a virtual volume $V'_1$ to $V'_n$ of the cache 100 may have multiple copies $V_1$ to $V_n$, called images, in the physical library P20$_1$ to P20$_n$. The creation and updating step (69), by the management module 30, of data representing information on the validity of the volumes $V_1$ to $V_n$ present in the cartridges P21$_1$ to P21$_n$ of the physical libraries P20$_1$ to P20$_n$, allows the virtual volumes $V'_1$ to $V'_n$ of the cache 100 taken into account by the module 32 controlling cache occupancy, for calculation of occupancy rate, to be those which correspond to the virtual volumes $V'_1$ to $V'_n$ of the cache having <<disk only>> status, i.e. whose images present in the physical library are not all valid.

Finally, step (90) to compact the physical library P20$_1$ to P20$_n$ may comprise a step (91) in which the management module 30 uses the results of the operations performed by the module 31 of cache activity control, by the module 32 cache occupancy control and by the module 34 of activity control of the physical library P20$_1$ to P20$_n$. Through this use (91), the compacting of the valid volumes $V_1$ to $V_n$ of the physical library P20$_1$ to P20$_n$ by the management module 30 will be made in relation to the activity and occupancy of the cache 100, giving preference to accesses to the storage resources 20, 100 by the computer platforms 10$_1$ to 10$_n$ over accesses required for this compacting.

It will be obvious for persons skilled in the art that the present invention allows embodiments under numerous other specific forms without departing from the scope of application of the invention such as claimed. Therefore the described embodiments are to be considered as illustrative but can be modified in the field defined by the scope of the appended claims, and the invention is not to be construed as being limited to the foregoing details.

What is claimed is:

1. A storage system for data generated, in at least one format, by at least one computer platform, and transmitted to the storage system via at least one communication network (RC) through access means of the at least one computer platform, the storage system comprising:

processing means; and storage resources including:

a storage means containing at least one physical library with at least one robot capable of loading and unloading at least one data storage cartridge in and from at least one reader to allow the writing and reading of data transmitted by the computer platforms in the physical library; and a cache memory means in which said processing means emulate, vis-à-vis the computer platforms, at least one virtual library from the at least one physical library, so that the data stored in the physical library and the virtual library can be grouped into groups of virtual volumes of determined size having at least one image in the physical library and at least one image in the virtual library, and so that the access means of the computer platforms can access, for reading and writing, via the communication network (RC), an image in the cache memory means of each of the virtual volumes stored by the storage system, the cache memory means including a plurality of hard disks on which a plurality of partitions are distributed, wherein, the processing means includes a management module for managing accesses to the storage resources both in the physical library and in the virtual library, in relation to requests transmitted by the access means of the computer platforms to the storage system, and for emulation of the virtual volumes of the physical library into virtual volumes of the virtual library of the cache memory means, the management module including:

a cache activity control module for calculating at least one cache activity index per determined periods of time, reflecting utilization of the access bandwidth to the cache memory means; and a cache occupancy control module for calculating at least one cache occupancy rate at a given time, wherein, the management module triggers said calculations periodically or on an ad hoc basis, whenever space is allocated for a new virtual volume in the cache memory means, and, with reference to at least one management algorithm (AG) of the access bandwidth to the cache memory means, regulates occupancy of the cache memory means while managing priorities over time for access to the storage resources by the computer platforms to flush the cache memory means by a read/write operation of the virtual volumes of the cache memory means or by the storage system for at least one operation based on said calculations to thereby enable copying of data from at least one virtual volume of the virtual library toward at least one virtual volume of the physical library, wherein, the cache occupancy control module is configured to calculate an individual occupancy rate corresponding to calculation of the occupancy rate on each of the partitions of the cache memory means individually, and a mean occupancy rate corresponding to calculation of the occupancy rate of all the partitions of the cache memory means, and wherein, the at least one cache activity index per determined periods of time corresponds to a mean value, calculated over a determined number of successive time periods, of a maximum number of virtual volumes of the cache memory means that are simultaneously open during each determined period of time.

2. The storage system according to claim 1, wherein the management module compares the activity index corresponding to the mean value of the cache memory means with a minimum activity threshold and a maximum activity threshold, compares an individual occupancy rate of the cache memory means with a maximum occupancy threshold, and compares a mean occupancy rate of the cache memory means with a first priority threshold, below which occupancy of the cache memory means has priority over flushing, and a second flush start threshold, above which flushing of the cache memory means can be performed, so as to manage accesses to the cache memory means by the management algorithm (AG) for managing the access bandwidth to the cache memory means implemented in the storage system, wherein the accessing is done based on at least one of the following rules:

if the value of the individual occupancy rate of a partition is higher than the value of the maximum occupancy threshold, irrespective of the value of the activity index of the cache memory means, the flush operation of the cache memory means is essential and is authorized to start to the possible detriment of accesses to the cache memory means by the computer platform, part of the access bandwidth to the cache memory means is used for copying of one or more virtual volumes of this partition into the physical library during this flush operation, if the value of the activity index of the cache memory means is less or equal to the value of the minimum activity threshold, any flush operation of the cache memory means is authorized to start, to allow copying of one or more virtual volumes toward the physical library, if the value of the activity index of the cache memory means lies between the value of the minimum activity threshold and the value of the maximum activity threshold, a flush operation of the cache memory means already in progress is authorized to continue, copying of one or more virtual volumes from the cache memory means to the physical library being authorized during this flush operation in progress, but if no flush operation is in progress a new flush operation of the cache memory means is not authorized to start, if the value of the activity index of the cache memory means is higher than the value of the maximum activity threshold, a new flush operation of the cache memory means is not authorized to start and a flush operation of the cache memory means already in progress is interrupted, to the benefit of accessing to the cache memory means by the computer platform, unless the value of the individual occupancy rate of the cache memory means is higher than the value of the maximum occupancy threshold or unless the value of the mean occupancy rate of the cache memory means is higher than the flush start threshold, new copying of one or more virtual volumes from the cache memory means into the physical library, during a flush operation already in progress, is forbidden, and copying already in progress of one or more virtual volumes from the cache memory means to the physical library, during this flush operation in progress, is authorized to be completed, if the value of the mean occupancy rate of all the partitions of the cache memory means is less or equal to the value of the priority threshold, accesses to the storage resources in reply to requests transmitted by the access means of the computer platforms to the storage system have priority over the accesses needed to copy volumes requiring the same resources during a flush operation of the cache memory means, the copying can be deferred until release of the resources, if the value of the mean occupancy rate of all the partitions of the cache memory means is higher than the priority threshold, accesses to the storage resources in reply to requests transmitted by the access means of the computer platforms to the storage system, do not have priority over the accesses needed to copy volumes requiring the same resources during a flush operation of the cache memory means which can be started or continued to the possible detriment of accesses to the storage resources by the computer platforms, if the value of the mean occupancy rate of all the partitions of the cache memory means is less or equal to the value of the flush start threshold, a flush operation of the cache memory means toward the physical library is only authorized to start if the value of the activity index of the cache memory means is less or equal the value of the minimum activity threshold, and if the value of the mean occupancy rate of all the partitions of the cache memory means is higher than the value of the flush start threshold, a flush operation of the cache memory means toward the physical library is essential and is authorized to start.

3. The storage system according to claim 1, wherein the cache activity control module includes consulting means for consulting information generated by an organization module to calculate the activity index of the cache memory means by counting the number of open virtual volumes, the maximum activity threshold corresponding to the total number of virtual volumes of the cache memory means open at the same time which consume a fraction of the bandwidth that is considered too high to allow an internal operation to start which requires access to the cache memory means.

4. The storage system according to claim 1, wherein the management module further includes an organization module permanently keeping up-to-date information on the distribution of the partitions installed on the hard disks and on the distribution of data recorded on the partitions, said organization module, on the basis of said up-to-date information, generating at least one directory (RP) containing information on locations and utilization of the virtual volumes of the cache memory means, the virtual volumes on which reading or writing is in progress being identified as open virtual volumes, and the virtual volumes on which no reading or writing is in progress being identified as closed virtual volumes.

5. The storage system according to claim 4, wherein the mean occupancy rate of the cache memory means at a given time, corresponds, for all the partitions of the cache memory means, to a sum of the size of the data present in the closed virtual volumes having the disk only status and the size for all the partitions allocated to the open virtual volumes, irrespective of their status, wherein the mean occupancy rate of all the partitions of the cache memory means is obtained based on a comparison, for all partitions, of the sum with the total size available in all the partitions of the cache memory means.

6. The storage system according to claim 4, wherein the individual occupancy rate of each partition of the cache memory means at a given time, corresponds, for each of the partitions of the cache memory means individually, to the size of the data present in the virtual volumes having disk only status, whether they are open or closed, and wherein the individual occupancy rate of each partition is obtained based on a comparison of this size with the total available size in the partition under consideration.

7. The storage system according to claim 4, wherein the cache occupancy control module comprises consulting means to consult an information generated by an organization module to calculate the mean occupancy rate of the cache memory means by comparing the sum of the total size of the data present in the open virtual volumes, irrespective of their status, and the total size of the data present in the closed virtual volumes having disk only status, with the total storage capacity in all the partitions of the cache memory means, and to calculate the individual occupancy rate of each of the partitions of the cache memory means by comparing, for a given partition, the size of the data present in the virtual volumes having disk only status, whether they are open or closed, with the total storage capacity of this partition of the cache memory means.

8. The storage system according to claim 7, wherein the organization module cooperates with the cache activity control module and the cache occupancy control module to distribute the virtual volumes equitably over the partitions of the cache memory means, so as to promote homogeneous distribution over all the disks carrying the partitions of the cache memory means.

9. The storage system according to claim 4, wherein the management module provides access to content of the storage resources and verifies content of the physical library and virtual library to assign to each of the virtual volumes a status value from among a set of statuses comprising:

- disk only status when the virtual volume has an image in the virtual library of the cache memory means but does not have an image in the physical library or has at least one image in the physical library which is not valid or does not contain the same data as the image in the virtual library;
- out of cache status when the virtual volume does not have any image in the virtual library of the cache memory means;
- disk and tape status when the virtual volume has valid images both in the virtual library of the cache memory means and in the physical library;
- swapping in status when the virtual volume has an image in the progress of being loaded in the virtual library from an image in the physical library;
- swapping out status when the virtual volume has an image in the virtual library in the progress of being copied into an image of the physical library;
- incomplete status when the virtual volume of the virtual library is open and does not contain any data or contains incomplete data;
- moving out status when the virtual volume of the virtual library is in the progress of being copied from one partition of the cache memory means to another partition; and
- swappable status when the virtual volume has an image in the virtual library of the cache memory means but has at least one image in the physical library which is not valid or the image in the virtual library is in progress of being copied into an image of the physical library or the volume either has disk only status or swapping out status.

10. The storage system according to claim 9, wherein the mean occupancy rate of the cache memory means at a given time, calculated by the cache occupancy control module, corresponds for all the partitions of the cache memory means, to a sum of a size of data present in the closed virtual volumes having disk only status and a size for all the partitions allocated to the open virtual volumes, irrespective of their status, the sum being compared, for all partitions, to a total size available in all the partitions of the cache memory means, to obtain the mean occupancy rate of all the partitions of the cache memory means.

11. The storage system according to claim 9, wherein the individual occupancy rate of each partition of the cache memory means at a given time, calculated by the cache occupancy control module, corresponds, for each of the partitions of the cache memory means individually, to a size of a data present in the virtual volumes having disk only status, whether they are open or closed, the size being compared for each partition with the total available size in the partition under consideration, to obtain the individual occupancy rate of each partition.

12. The storage system according to claim 11, wherein the individual occupancy rate of each partition of the cache memory means at a given time, calculated by the cache occupancy control module, corresponds, for each of the partitions of the cache memory means individually, to a size of a data present in the virtual volumes having disk only status, whether they are open or closed, the size being compared for each partition with a total available size in the partition under consideration, to obtain the individual occupancy rate of each partition.

13. The storage system according to claim 4, wherein the management module, during the flush operation of the cache memory means, based on the results of the calculations made by the cache occupancy control module selects the virtual volumes of the cache memory means to be copied into the physical library, the virtual volumes selected being the closed virtual volumes having disk only status and were less recently accessed, for reading or writing, by the computer platforms, either in a given partition of the cache memory means if the value of the individual occupancy rate of this partition is greater or equal to the value of the maximum occupancy threshold, or in all the partitions of the cache memory means if the values of the individual occupancy rates of all the partitions are below the value of the maximum occupancy threshold.

14. The storage system according to claim 13, wherein the management module includes an activity control module for the physical library, keeping permanently up to date at least information on the utilization of the readers and of the cartridges of the physical libraries under the control of the storage system, so as to enable the management module to manage priorities over time for accesses to the storage resources by the system to flush at least one virtual volume of the cache memory means toward at least one virtual volume of the physical library, and by the computer platforms to read/write a virtual volume not present in the cache memory means so as to necessitate consultation of the physical library to copy a virtual volume of the physical library toward the cache memory means in the form of a virtual volume of the virtual library.

15. The storage system according claim 14, wherein the management module, through its access means to the content of the storage resources of the system, keeps permanently up to date at least information on the validity of the virtual volumes present in the data storage cartridges of the physical library under the control of the storage system, with respect to the virtual volumes which may have been modified in the cache memory means by the computer platforms, so as to enable the management module to compare a space occupied by obsolete virtual volumes in the data storage cartridges of the physical library with a maximum invalidity threshold, and when the space of obsolete virtual volumes reaches this threshold, to perform compacting of valid volumes of the physical library, in the data storage cartridges containing virtual volumes in the physical library that are not utilized and corresponding to closed virtual volumes in the cache memory means, by controlling the reading of all valid volumes of the data storage cartridges containing obsolete volumes and simultaneously copying the valid volumes into target cartridges, so as to erase the data storage cartridges and obtain only cartridges containing valid volumes in the physical library and empty cartridges.

16. The storage system according to claim 15, wherein a virtual volume of the cache memory means may have multiple images in the physical library, and the virtual volumes of the cache memory means which were taken into account by the cache occupancy control module for the calculation of the occupancy rate, are volumes which correspond to the virtual volumes of the cache memory means having disk only status, or to images present in the physical library which are not all valid.

17. The storage system according to claim 15, wherein the management module is compacts valid volumes of the physical library based on the results of operations performed by the cache activity control module, cache occupancy control module, and an activity control module of the physical library, so that the compacting of the valid volumes is conducted in relation to the activity and occupancy of the cache memory means, giving preference to access to the storage resources by the computer platforms over accessing required for this compacting.

18. The storage system according to claim 17, wherein the processing means is configured to run a software application included in the management module, the cache activity control module, the cache occupancy control module, the organization module, and the activity control module of the storage system and is responsible for the interoperability of the different means of the system, the software application cooperating with an operating system installed on the storage system to manage the operations to be performed by generating information on at least the locations and utilization of all data present in the storage system, data needed for running this application being previously recorded in a memory accessible by the processing means of the storage system.

19. A method for saving/storing data generated, in at least one format, by at least one computer platform and transmitted to a storage system via a communication network (RC) through platform access means accessing the storage system, the method comprising:

emulating, by a management module, virtual volumes of a physical library included in a storage means into virtual volumes of a virtual library of a cache memory means included in a processing means of the storage system, the cache memory means including a plurality of hard disks on which a plurality of partitions are distributed and managing accesses to storage resources including the storage means and the cache memory means both to the virtual volumes of the physical library and to the virtual volumes of the cache memory means, in relation to requests transmitted by the access means of the computer platforms to the storage system;

calculating, by a cache activity control module, at least one activity index of the cache memory means per determined periods of time, reflecting utilization of the access bandwidth to the cache memory means, the calculating being repeated to monitor changes in activity of the cache memory means periodically or on an ad hoc basis whenever space is allocated for a new virtual volume in the cache memory means;

calculating, by a cache occupancy control module, at least one occupancy rate of the cache memory means at a given time, the calculation being repeated to monitor changes in occupancy of the cache memory means periodically or an ad hoc basis whenever space is allocated for a new virtual volume in the cache memory means; and deciding, by the management module, based on results of the calculations by the cache activity control module and the cache occupancy control module and at least one management algorithm (AG) implemented in the storage system for managing the access bandwidth to the cache memory means, between authorization or interdiction of access to the storage resources by the computer platforms to read/write virtual volumes in the cache memory means, or by the system itself for at least one cache flush operation to allow copying of data from at least one virtual volume of the virtual library to at least one virtual volume of the physical library, so as to regulate occupancy of the cache memory means and to manage priorities over time for accesses to the storage resources by the computer platforms and by the storage system, wherein the cache occupancy control module is configured to calculate an individual occupancy rate corresponding to calculation of the occupancy rate on each of the s artitions of the cache memo means individually, and a mean occupancy rate corresponding to calculation of the occupancy rate of all the partitions of the cache memory means, and wherein, the calculating of at least one cache activity index per determined periods of time includes calculating a mean value, calculated over a determined number of successive determined time periods, of a maximum number of virtual volumes of the cache memory means opened simultaneously during each determined time periods.

20. The method according to claim 19, wherein the calculating of the individual occupancy rate of each partition of the cache memory means by the cache occupancy control module, includes measuring, for each of the partitions of the cache memory means individually, a total size of the data present in the virtual volumes having disk only status, whether they are open or closed, the total size being compared with a total available size in the partition under consideration, to obtain the mean occupancy rate of each of the partitions of the cache memory means.

21. The method according to claim 19, wherein the flush operation of the cache memory means, results from the use, by the management module, of the results of the calculations made by the cache occupancy control module, to select the virtual volumes of the cache memory means to be copied into the physical library, the virtual volumes selected being closed virtual volumes having disk only status and are less recently accessed for reading or writing by the computer platforms, either in a given partition of the cache memory means if the value of the individual occupancy rate of this partition is greater or equal to the value of the maximum occupancy threshold, or in all the partitions of the cache memory means if the values of the individual occupancy rates of all the partitions are lower than the value of the maximum occupancy threshold.

22. The method according to claim 19, further comprising creating and updating, by an activity control module of the physical library, of data representing information on utilization of the readers and of the cartridges of the libraries under the control of the storage system, the information enabling the management module to manage priorities over time for accesses to the storage resources, by the system itself to flush at least one virtual volume from the cache memory means toward a volume of the physical library, and by the computer platforms to read/write a virtual volume not present in the cache memory means and therefore necessitating consultation of the physical library to copy a volume from the physical library to the cache memory means in the form of a virtual volume of the virtual library.

23. The method according to claim 19, further comprising:

installing a software application in an operating system of the storage system, said software application being included in the management module, the cache activity control module, the cache occupancy control module, the organization module, and the activity control module, of the storage system and is responsible for the interoperability of the different means of the system, said software application cooperating with an operating system installed on the storage system to manage the operations to be performed by generating information on at least a locations and utilization of all data present in the storage system, the installing enabling recording of data needed to run the application in a memory accessible by the processing means of the system.

24. The method according to claim 19, wherein the calculating of the mean occupancy rate of the cache memory means by the cache occupancy control module includes measuring, for all the partitions of the cache memory means, a sum of a size of the data present in the closed virtual volumes having disk only status and a size allocated to the open virtual volumes, irrespective of their status, the sum being compared with a total size available in all the partitions of the cache memory means to obtain the mean occupancy rate of all the partitions of the cache memory means.

25. The method according to claim 24, further comprising:

comparing, by the management module, the activity index corresponding to the mean value of the cache memory means with a minimum activity threshold and a maximum activity threshold, comparing an individual occupancy rate of the cache memory means with the maximum occupancy threshold, and comparing a mean occupancy rate with a first threshold called a priority threshold, below which occupancy of the cache memory means has priority over flushing, and with a second threshold called a flush start threshold above which flushing of the cache memory means can be performed, to manage accesses to the cache memory means by the management algorithm (AG) for managing the access bandwidth to the cache memory means based on at least one of the following rules:

if the value of the individual occupancy rate of a partition of the cache memory means is higher than the value of the maximum occupancy threshold, irrespective of the value of the activity index of the cache memory means, the flush operation of the cache memory means is essential and is authorized to start to the possible detriment of accesses to the cache memory means by the computer platforms, part of the access bandwidth to the cache memory means is being used to copy one or more virtual volumes from this partition toward the physical library during this flush operation, if the value of the activity index of the cache memory means is less or equal to the minimum activity threshold, any flush operation of the cache memory means is authorized to start, to allow the copying of one or more virtual volumes toward the physical library, if the value of the activity index of the cache memory means lies between the value of the minimum activity threshold and the value of the maximum activity threshold, a flush operation of the cache memory means already in progress is authorized to continue, the copying of one or more virtual volumes from the cache memory means to the physical library being authorized during this flush operation in progress, but if no flush operation is in progress a new flush operation of the cache memory means is not authorized to start, if the value of the activity index of the cache is higher than the value of the maximum activity threshold, a new flush operation of the cache memory means is not authorized to start and a flush operation of the cache memory means already in progress is interrupted, to the benefit of accessing to the cache memory means by the computer platforms, unless the value of the individual occupancy rate of the cache memory means is higher than the value of the maximum occupancy threshold or unless the value of the mean occupancy rate of the cache memory means is higher than the flush start threshold, new copying of one or more virtual volumes from the cache memory means to the physical library during a flush operation already in progress is being forbidden, and copying already in progress of one or more virtual volumes from the cache memory means to the physical library during the flush operation in progress is authorized to be completed, if the value of the mean occupancy rate of all the partitions of the cache memory means is less or equal to the priority threshold, accesses to the storage resources, in reply to requests transmitted by the access means of the computer platforms to the storage system, have priority over accessing needed to copy volumes requiring the same resources during a flush operation of the cache memory means, the copying is deferred until release of these resources, if the value of the mean occupancy rate of all the partitions of the cache memory means is higher than the priority threshold, accesses to the storage resources in reply to requests transmitted by the access means of the computer platforms to the storage system do not have priority over accesses needed to copy volumes requiring the same resources during a flush operation of the cache memory means, which can start or continue to the possible detriment of accessing to the storage resources by the computer platforms, if the value of the mean occupancy rate of all the partitions of the cache memory means is less or equal to the value of the flush start threshold, a flush operation of the cache memory means toward the physical library is only authorized to start if the value of the activity index of the cache memory means is less or equal to the value of the minimum activity threshold, and if the value of the mean occupancy rate of all the partitions of the cache memory means is higher than the value of the flush start threshold, a flush operation of the cache memory means toward the physical library is essential and is authorized to start.

26. The method according to claim 24, wherein the calculating the occupancy rate of the cache memory means by the cache occupancy control module includes at least one consultation of data generated by the organization module to calculate the mean occupancy rate of the cache memory means by comparing the sum of the total size of the data present in the open virtual volumes, irrespective of their status, and the total size of the data present in the closed virtual volumes having disk only status, with the total storage capacity of all the partitions of the cache memory means, and to calculate the individual occupancy rate of each of the partitions of the cache memory means by comparing, for a given partition, the size of the data present in the virtual volumes having disk only status, whether they are open or closed, with the total storage capacity of this partition of the cache memory means.

27. The method according to claim 19, further comprising: creating and updating, by an organization module, data representing information on distribution of partitions and distribution of data recorded in the partitions, said organization module, based on this information, generating at least one directory (RP) containing information on locations and utilization of the virtual volumes, wherein the virtual volumes on which reading or writing is in progress being identified as open virtual volumes, and the virtual volumes on which no reading or writing is in progress being identified as closed virtual volumes.

28. The method according to claim 27, wherein the calculating the activity index of the cache memory means by the cache activity control module, includes at least one consultation of data generated by the organization module, to calculate the activity index of the cache memory means by counting the number of open virtual volumes in the cache memory means, the maximum activity threshold corresponding to the total number of virtual volumes of the cache memory means open at the same time which consume a fraction of the access bandwidth considered too high to allow start of an internal operation requiring access to the cache memory means.

29. The method according to claim 27, wherein the emulating of the virtual volumes by the management module includes cooperating the organization module with the cache activity control module and the cache occupancy control module to distribute the virtual volumes equitably over the partitions of the cache memory means, in order to promote homogeneous distribution over all the hard disks carrying the partitions of the cache memory means.

30. The method according to claim 27, further comprising:

verifying content of the physical library and the virtual library by the management module, via access means to content of the storage resources of the system, followed by assigning to each of the virtual volumes a value called a status, from among a set of statuses comprising:

disk only status when the virtual volume has an image in the virtual library of the cache memory means but does not have an image in the physical library, or has at least one image in the physical library which is not valid, or does not contain the same data as the image in the virtual library;

out of cache status when the virtual volume does not have any image in the virtual library of the cache memory means;

disk and tape status when the virtual volume has valid images both in the virtual library of the cache memory means and in the physical library;

swapping in status when the virtual volume has an image in progress of being loaded into the virtual library from an image in the physical library;

swapping out status when the virtual volume has an image in the virtual library in progress of being copies into an image of the physical library;

incomplete status when the virtual volume of the virtual library is open and does not contain any data, or contains incomplete data;

moving out status when the virtual volume of the virtual library is in progress of being copied from one partition of the cache memory means to another, and swappable status when the virtual volume has an image in the virtual library of the cache memory means but has at least one image in the physical library which is not valid or the image in the virtual library is in progress of being copied into an image of the physical library, or the volume either has disk only status or swapping out status.

31. The method according to claim 30, further comprising:

creating and updating, by the management module, of data representing information on the validity of the volumes present in the cartridges of the physical libraries under the control of the storage system, with respect to the virtual volumes which may have been modified in the cache memory means by the computer platforms, the information on validity enabling the management module to implement comparing of a space occupied by obsolete virtual volumes in the cartridges of the physical library with a maximum invalidity threshold and, if the space occupied by the obsolete virtual volumes reaches the threshold, to implement compacting of the valid volumes taken from cartridges containing volumes that are non-utilized and correspond to closed virtual volumes, by controlling the reading of all valid volumes of source cartridges containing obsolete volumes and simultaneously copying the valid volumes into target cartridges, so as to erase the source cartridges and only obtain cartridges containing valid volumes in the physical library.

32. The method according to claim 31, wherein emulating the virtual volumes of the physical library into virtual volumes of the virtual library of the cache memory means and the managing of the cache memory means by the management module allows for a virtual volume of the cache memory means to have multiple images in the physical library, and the creating and updating by the management module to create and update information representing validity of the volumes present in the storage cartridges of the physical libraries allows the virtual volumes of the cache memory means taken into account by the cache occupancy control module for calculation of the occupancy rate, to correspond to the virtual volumes of the cache memory means having disk only status, or having images present in the physical library which are not all valid.

33. The method according to claim 31, wherein the compacting of the physical library includes a step, in which the management module uses the results of the operations performed by the cache activity control module, the cache occupancy control module, and activity control module of the physical library, so that the compacting of the valid volumes of the physical library by the management module is performed in relation to the activity and occupancy of the cache memory means, by giving preference to accessing to the storage resources by the computer platforms over accessing needed for the compacting.

* * * * *

UNITED STATES PATENT AND TRADEMARK OFFICE

CERTIFICATE OF CORRECTION

PATENT NO. : 7,873,790 B2
APPLICATION NO. : 11/866619
DATED : January 18, 2011
INVENTOR(S) : Jean-Louis Bouchou and Christian Dejon It is certified that error appears in the above-identified patent and that said Letters Patent is hereby corrected as shown below:

Column 34 – Line 14, delete “s”.

Column 34 – Line 15, delete “artitions” and replace with --partitions--.

Column 34 – Line 15, delete “memo” and replace with --memory--.

Signed and Sealed this
Nineteenth Day of April, 2011

David J. Kappos
*Director of the United States Patent and Trademark Office*